United States Patent
Inoue et al.

(10) Patent No.: US 10,443,878 B2
(45) Date of Patent: Oct. 15, 2019

(54) AIR CONDITIONER

(71) Applicant: DAIKIN INDUSTRIES, LTD., Osaka-shi, Osaka (JP)

(72) Inventors: Ryouji Inoue, Osaka (JP); Yukio Inoue, Osaka (JP); Ryousuke Yamamoto, Osaka (JP); Yasuaki Kobayashi, Osaka (JP); Asuka Yagi, Osaka (JP); Tatsuya Higuchi, Osaka (JP); Youta Katou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/061,259

(22) PCT Filed: Dec. 6, 2016

(86) PCT No.: PCT/JP2016/086251
§ 371 (c)(1),
(2) Date: Jun. 11, 2018

(87) PCT Pub. No.: WO2017/104488
PCT Pub. Date: Jun. 22, 2017

(65) Prior Publication Data
US 2018/0363936 A1 Dec. 20, 2018

(30) Foreign Application Priority Data
Dec. 18, 2015 (JP) .................................. 2015-247688

(51) Int. Cl.
*F24F 11/58* (2018.01)
*H04M 11/00* (2006.01)
(Continued)

(52) U.S. Cl.
CPC .............. *F24F 11/58* (2018.01); *F24F 11/61* (2018.01); *F24F 11/89* (2018.01);
(Continued)

(58) Field of Classification Search
CPC ........................... F24F 11/58; G07C 9/00039
(Continued)

(56) References Cited

U.S. PATENT DOCUMENTS

2008/0252509 A1* 10/2008 Yokozawa ............. G08C 17/02
341/176
2015/0167995 A1 6/2015 Fadell et al.
(Continued)

FOREIGN PATENT DOCUMENTS

DE 10 2014 201 468 B3 2/2015
JP 2002-112356 A 4/2002
(Continued)

OTHER PUBLICATIONS

International Search Report of corresponding PCT Application No. PCT/JP2016/086251 dated Mar. 7, 2017.
(Continued)

*Primary Examiner* — Vernal U Brown
(74) *Attorney, Agent, or Firm* — Global IP Counselors, LLP

(57) ABSTRACT

An air conditioner is installed in a target space. An operating state is switched based on a command sent from a portable communication terminal. The air conditioner includes a specific information storage component, a specific information notification component that gives notification of the specific information to the communication terminal, a command receiving component that receives the command sent from the communication terminal, and an actuator drive component that executes a switching control that switches action of an actuator based on the command received. The specific information includes identification information and operable period information that designates an operable period during which the operating state is switchable by the communication terminal. The actuator drive component does not execute the switching control in response to the command sent from the communication terminal for which the operable period designated in the operable period information of which notification was given has expired.

13 Claims, 12 Drawing Sheets

(51) Int. Cl.
  *H04Q 9/00* (2006.01)
  *F24F 11/89* (2018.01)
  *F24F 11/61* (2018.01)
  *G07C 9/00* (2006.01)

(52) U.S. Cl.
  CPC ..... *G07C 9/00023* (2013.01); *G07C 9/00039* (2013.01); *H04M 11/00* (2013.01); *H04Q 9/00* (2013.01)

(58) Field of Classification Search
  USPC ........................................................ 340/5.28
  See application file for complete search history.

(56) References Cited

U.S. PATENT DOCUMENTS

| | | | | |
|---|---|---|---|---|
| 2016/0161960 | A1* | 6/2016 | Yamada | G06F 3/04847 700/277 |
| 2017/0264979 | A1* | 9/2017 | Masuda | H04M 11/00 |

FOREIGN PATENT DOCUMENTS

| | | | |
|---|---|---|---|
| JP | 2013-76493 A | 4/2013 | |
| JP | 2014-16091 A | 1/2014 | |

OTHER PUBLICATIONS

International Preliminary Report of corresponding PCT Application No. PCT/JP2016/086251 dated Jun. 28, 2018.
European Search Report of corresponding EP Application No. 16 87 5470.3 dated Jul. 30, 2019.

* cited by examiner

| UTILIZATION SPACE | PERMITTED COMMANDS | PROHIBITED COMMANDS |
|---|---|---|
| SP1 | SWITCH BETWEEN STARTING/STOPPING | SWITCH OPERATING MODE |
| | SELECT SET TEMPERATURE | |
| | SELECT SET AIR VOLUME | |
| | SELECT SET AIR DIRECTION | |

FIG. 8

AIR CONDITIONER

CROSS-REFERENCE TO RELATED APPLICATIONS

This U.S. National stage application claims priority under 35 U.S.C. § 119(a) to Japanese Patent Application No. 2015-247688, filed in Japan on Dec. 18, 2015, the entire contents of which are hereby incorporated herein by reference.

TECHNICAL FIELD

The present invention relates to an air conditioner.

BACKGROUND ART

Conventionally, air conditioners configured in such a way that they can communicate with a portable communication terminal in the possession of a user and configured in such a way that their operating state can be switched via the portable communication terminal have been proposed. For example, JP-A No. 2013-76493 discloses an air conditioner whose operating state switches in accordance with commands input via a smartphone (i.e., the smartphone functions as a command input device that inputs commands).

SUMMARY

In addition to the air conditioner such as described above being installed in a space in which the user and the manager coincide with each other, such as a general household, cases are also conceivable where the air conditioner is installed in a space in which the user temporarily stays (i.e., a space in which the user and the manager do not coincide with each other), such as a room in a hotel, a rental room or the like. In such cases, it is desired for security reasons to permit a user who will temporarily stay in the space in which the air conditioner is installed (i.e., a person who has use authorization) to switch the operating state while limiting a vacating person whose stay has ended (i.e., a person who has lost use authorization) from switching the operating state.

However, in a case where the conventional air conditioner such as disclosed in JP-A No. 2013-76493 is installed in a space in which the user and the manager do not coincide with each other, it becomes possible for the operating state to be switched even by the portable communication terminal of a vacating person, which is not preferred for security reasons.

Therefore, it is a problem of the present invention to provide an air conditioner with excellent security.

An air conditioner pertaining to a first aspect of the invention is installed in a target space, has its operating state switched on the basis of a command sent from a portable communication terminal that a user has, and performs air conditioning of the target space, the air conditioner having a specific information storage component, a specific information notification component, a command receiving component, and an actuator drive component. The specific information storage component stores specific information. Included in the specific information is identification information that identifies itself. The specific information notification component gives notification of the specific information to the portable communication terminal. The command receiving component receives the command sent from the portable communication terminal to which notification of the specific information was given. The actuator drive component executes switching control. The switching control is control that switches action of an actuator on the basis of the received command. The specific information includes operable period information. The operable period information is information that designates an operable period in which it is possible for the operating state to be switched by the portable communication terminal to which notification was given. The actuator drive component does not execute the switching control in response to the command sent from the portable communication terminal for which the operable period designated in the operable period information of which notification was given has expired.

In the air conditioner pertaining to the first aspect of the invention, the specific information notification component gives notification of the specific information including the identification information and the operable period information to the portable communication terminal, and the actuator drive component executes the switching control on the basis of the command sent from the portable communication terminal to which notification of the specific information was given but does not execute the switching control in response to the command sent from the portable communication terminal for which the operable period designated in the operable period information of which notification was given has expired. Because of this, in a case where the air conditioner is installed in a facility in which the user temporarily stays (i.e., a space in which the user and the manager do not coincide with each other), such as a lodging facility like a hotel, a rental room, or the like, it becomes possible to limit the portable communication terminal made to function as a command input device, and it becomes possible to limit the operator to the manager and the user of the facility (i.e., a person who has use authorization). In particular, it becomes possible to limit the switching of the operating state by the portable communication terminal of a vacating person whose use of the facility has already ended (i.e., a person who does not have use authorization). As a result, even in a case where the air conditioner is installed in a space in which the user and the manager do not coincide with each other, the operating state of the air conditioner is kept from being switched by an outsider who does not have use authorization. Thus, security is improved.

It will be noted that "air conditioner" here includes various devices that are installed in a target space and perform air conditioning, such as an indoor unit of an air conditioning system, an air purifier, a ventilation device, a dehumidifier, or the like.

An air conditioner pertaining to a second aspect of the invention is the air conditioner pertaining to the first aspect, wherein the operable period information includes information that specifies a start timing and an end timing. The start timing is a timing at which it becomes possible for the operating state to be switched by the portable communication terminal to which notification of the operable period information was given. The end timing is a timing at which it becomes impossible for the operating state to be switched by the portable communication terminal to which notification of the operable period information was given.

Because of this, it becomes possible to set the operable period in accordance with the timing at which the user starts operation. Thus, in a case where the air conditioner is installed in a space in which the user and the manager do not coincide with each other, convenience is excellent for managing the air conditioner.

An air conditioner pertaining to a third aspect of the invention is the air conditioner pertaining to the first aspect or the second aspect, wherein the specific information notification component gives notification of the specific information including new operable period information to the portable communication terminal that is in the target space and for which the operable period designated in the operable period information of which notification was given has expired.

Because of this, it becomes possible to set a new operable period for a user who continues use even after the end of the operable period. Thus, in a case where the air conditioner is installed in a space in which the user and the manager do not coincide with each other, security is ensured and convenience is more excellent.

An air conditioner pertaining to a fourth aspect of the invention is the air conditioner pertaining to any of the first aspect to the third aspect, further having a judgment component. The judgment component performs a judgment of whether or not to establish a communication connection with the portable communication terminal on the basis of a request signal sent from the portable communication terminal. The judgment component performs the judgment on the basis of the suitability of password information included in the request signal. The password information is included in the specific information.

Because of this, in a case where the air conditioner is installed in a space in which the user and the manager do not coincide with each other, it becomes possible to further limit the portable communication terminal made to function as a command input device, and it becomes possible to limit the operator to the manager and a specific user. As a result, even in a case where the air conditioner is installed in a space in which the user and the manager do not coincide with each other, the air conditioner is further kept from being operated by an outsider who does not have use authorization. Thus, it becomes possible to further improve security.

It will be noted that "the suitability of password information" here includes the correctness/incorrectness of password information as well as the presence/absence of password information.

An air conditioner pertaining to a fifth aspect of the invention is installed in a target space, has its operating state switched on the basis of a command sent from a portable communication terminal that a user has, and performs air conditioning of the target space, the air conditioner having a specific information storage component, a specific information notification component, a command receiving component, an actuator drive component, and a judgment component. The specific information storage component stores specific information. Included in the specific information is identification information that identifies itself. The specific information notification component gives notification of the specific information to the portable communication terminal. The command receiving component receives the command sent from the portable communication terminal to which notification of the specific information was given. The actuator drive component executes switching control. The switching control switches action of an actuator on the basis of the received command. The judgment component performs a judgment of whether or not to establish a communication connection with the portable communication terminal on the basis of a request signal sent from the portable communication terminal. The judgment component performs the judgment on the basis of the suitability of password information. The password information is included in the request signal. The password information is included in the specific information.

In the air conditioner pertaining to the fifth aspect of the invention, the specific information notification component gives notification of the specific information including the password information to the portable communication terminal, and the judgment component performs the judgment of whether or not to establish a communication connection with the portable communication terminal on the basis of the suitability of the password information included in the request signal sent from the portable communication terminal. Because of this, in a case where the air conditioner is installed in a facility in which the user temporarily stays (i.e., a space in which the user and the manager do not coincide with each other), such as a lodging facility like a hotel, a rental room, or the like, it becomes possible to limit the portable communication terminal made to function as a command input device, and it becomes possible to limit the operator to the manager and the user of the facility (i.e., a person who has use authorization). In particular, it becomes possible to limit the switching of the operating state by the portable communication terminal of a vacating person whose use of the facility has already ended (i.e., a person who does not have use authorization). As a result, even in a case where the air conditioner is installed in a space in which the user and the manager do not coincide with each other, the operating state of the air conditioner can be kept from being switched by an outsider who does not have use authorization. Thus, security is improved.

It will be noted that "the suitability of password information" here includes the correctness/incorrectness of password information as well as the presence/absence of password information.

It will be noted that "air conditioner" here includes various devices that are installed in a target space and perform air conditioning, such as an indoor unit of an air conditioning system, an air purifier, a ventilation device, a dehumidifier, or the like.

An air conditioner pertaining to a sixth aspect of the invention is the air conditioner pertaining to the fourth aspect or the fifth aspect, wherein the communication connection includes a manager connection and a user connection. The manager connection is a communication connection with the portable communication terminal of a manager. The user connection is a communication connection with the portable communication terminal of the user other than the manager. The air conditioner pertaining to the sixth aspect of the invention further has a manager password storage component and a user password storage component. The manager password storage component stores manager password information. The manager password information is the password information needed for the manager connection. The user password storage component stores user password information. The user password information is password information needed for the user connection. The judgment component performs a judgment of whether or not to establish the manager connection on the basis of the suitability of the manager password information included in the request signal. The judgment component performs a judgment of whether or not to establish the user connection on the basis of the suitability of the user password information included in the request signal.

Because of this, in a case where the air conditioner is installed in a space in which the user and the manager do not coincide with each other, it becomes possible to set the setting item that can be switched within the operating state for each communication connection established between the air conditioner and the portable communication terminal. As a result, it becomes possible to manage the air conditioner in such a way that each user is permitted to perform general operations but only the manager can perform specific operations. Thus, it becomes possible to further improve security.

An air conditioner pertaining to a seventh aspect of the invention is the air conditioner pertaining to any of the first aspect to the sixth aspect, further having a setting item information storage component. The setting item information storage component stores setting item information. The setting item information is information that specifies a permitted item. The permitted item is a setting item, within the operating state, that can be switched by the portable communication terminal. The actuator drive component does not execute the switching control in a case where the command sent from the portable communication terminal is a command that instructs the switching of a setting item other than the permitted item specified in the setting item information.

Because of this, in a case where the air conditioner is installed in a space in which the user and the manager do not coincide with each other, setting items (permitted items) that can be switched by the portable communication terminal of the user other than the manager are designated. As a result, it easily becomes possible to manage the air conditioner in such a way that each user is permitted to perform general operations but only the manager can perform specific operations. Thus, it becomes possible to further improve security, and convenience is excellent for managing the air conditioner.

An air conditioner pertaining to an eighth aspect of the invention is the air conditioner pertaining to any of the first aspect to the seventh aspect, wherein the command receiving component performs communication with the portable communication terminal via a wireless communication network. The wireless communication network is constructed using a predetermined wireless communication standard. The specific information notification component gives notification of the specific information to the portable communication terminal by another communication network different from the wireless communication network or another notification unit.

Because of this, notification of the specific information is given to the portable communication terminal using a notification unit or a communication network different from the wireless communication network utilized in the case of receiving the command from the portable communication terminal (i.e., in a case where the portable communication terminal functions as an input device). That is, it becomes possible to give notification of the specific information using a dedicated communication network or a notification unit. Thus, it becomes possible to further improve security.

In the air conditioner pertaining to the first aspect and the fifth aspect of the invention, even in a case where the air conditioner is installed in a space in which the user and the manager do not coincide with each other, the operating state of the air conditioner is kept from being switched by an outsider who does not have use authorization. Thus, security is improved.

In the air conditioner pertaining to the second aspect of the invention, in a case where the air conditioner is installed in a space in which the user and the manager do not coincide with each other, convenience is excellent for managing the air conditioner.

In the air conditioner pertaining to the third aspect of the invention, in a case where the air conditioner is installed in a space in which the user and the manager do not coincide with each other, security is ensured and convenience is more excellent.

In the air conditioner pertaining to the fourth aspect and the sixth aspect of the invention, it becomes possible to further improve security.

In the air conditioner pertaining to the seventh aspect of the invention, it becomes possible to further improve security, and convenience is excellent for managing the air conditioner.

In the air conditioner pertaining to the eighth aspect of the invention, it becomes possible to further improve security.

BRIEF DESCRIPTION OF DRAWINGS

FIG. 8 is a schematic drawing of a setting item table.

DESCRIPTION OF EMBODIMENT

An indoor unit 20 (air conditioner) pertaining to an embodiment of the invention will be described below. It will be noted that the following embodiment is a specific example of the invention, is not intended to limit the technical scope of the invention, and can be appropriately changed in a range that does not depart from the spirit of the invention. Furthermore, the directions of up, down, left, right, front surface (front), and back surface (rear) in the following embodiment mean the directions shown in FIG. 4, FIG. 5, and FIG. 9.

In the present embodiment, the indoor unit 20 is included in an air conditioning system 100.

(1) Air Conditioning System 100

Figure 1:
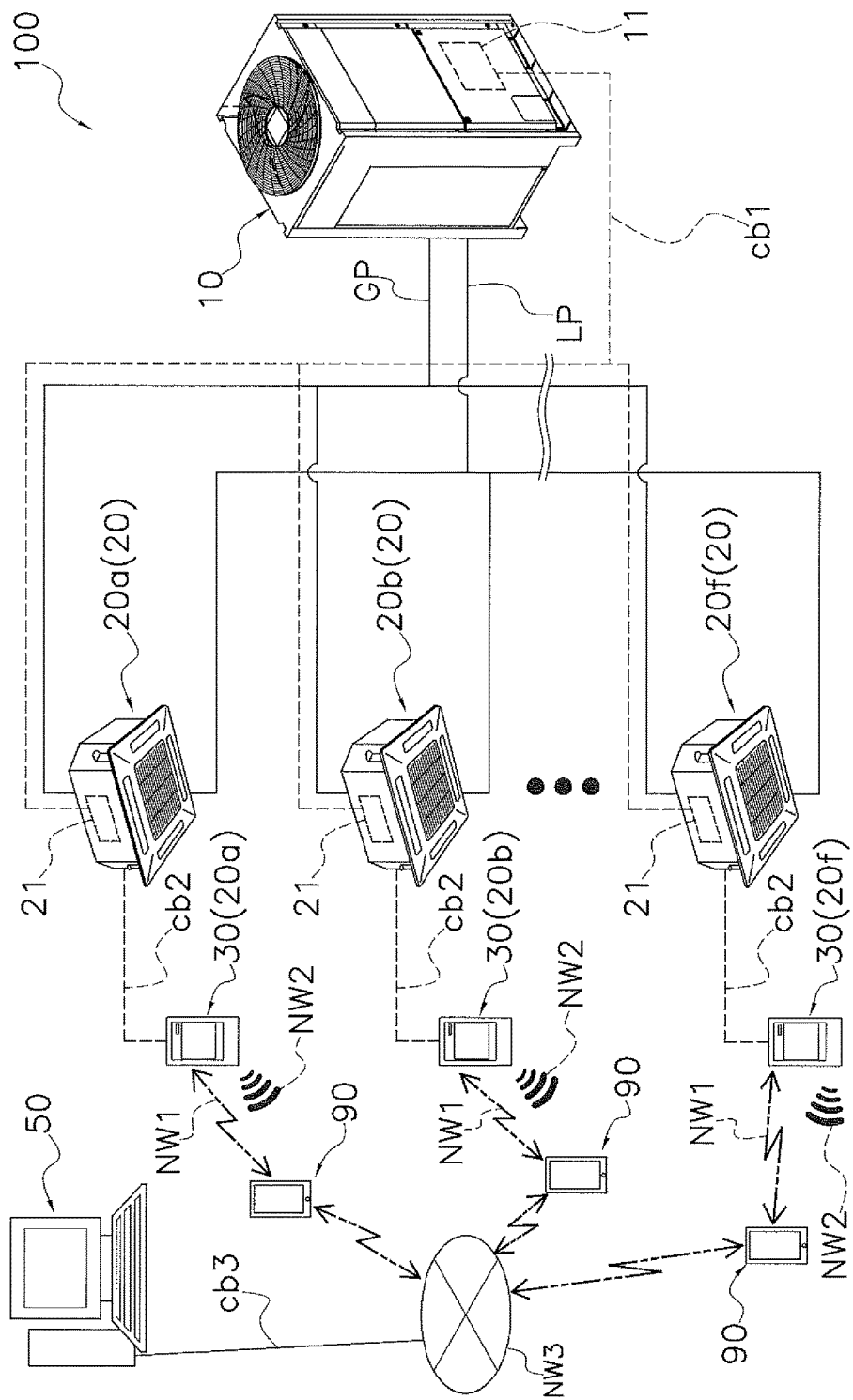
FIG. 1 is a general configuration drawing of an air conditioning system including indoor units.

FIG. 1 is a general configuration drawing of the air conditioning system 100 including the indoor unit 20. The air conditioning system 100 is a system that realizes air conditioning such as heating and cooling in target spaces included inside a house or the like. In particular, it is presumed that the air conditioning system 100 is installed in a facility that includes a space in which a user temporarily stays, that is, a space in which the manager and the user do not coincide with each other (hereinafter this space will be called a "utilization space SP"), such as a room in a hotel, a rental room or the like. In the present embodiment, the air conditioning system 100 is applied to a facility 1 that includes plural (here, six) utilization spaces SP (SP1, SP2, SP3, SP4, SP5, and SP6) (see FIG. 3).

The air conditioning system 100 includes a refrigerant circuit and performs cooling or heating of the utilization spaces SP by causing refrigerant to circulate in the refrigerant circuit to thereby perform a vapor compression refrigeration cycle. The air conditioning system 100 has plural operating modes including a cooling mode and a heating mode and performs operations according to the operating mode. Specifically, the air conditioning system 100 performs a cooling operation in the cooling mode and performs a heating operation in the heating mode.

The air conditioning system 100 is mainly equipped with one outdoor unit 10 serving as a heat source unit, plural (here, six) indoor units 20 (20*a*, 20*b*, 20*c*, 20*d*, 20*e*, and 20*f*) serving as utilization units, and a management server 50. In the present embodiment, the indoor unit 20*a* is installed in the utilization space SP1, the indoor unit 20*b* is installed in the utilization space SP2, the indoor unit 20*c* is installed in the utilization space SP3, the indoor unit 20*d* is installed in the utilization space SP4, the indoor unit 20*e* is installed in the utilization space SP5, and the indoor unit 20*f* is installed in the utilization space SP6 (see FIG. 3). In the air conditioning system 100, the refrigerant circuit is configured as a result of the outdoor unit 10 and each indoor unit 20 being interconnected by a gas communication pipe GP and a liquid communication pipe LP.

Here, the air conditioning system 100 is configured in such a way that it can communicate with a portable communication terminal 90 (hereinafter simply called "the terminal 90") equipped with a wireless communication function and retained by a manager or a user. The air conditioning system 100 is configured in such a way that its operating state can be switched by commands sent from the terminal 90. That is, in the air conditioning system 100, the terminal 90 can be made to function as a "command input device" for inputting commands that switch the operating state.

Figure 2:
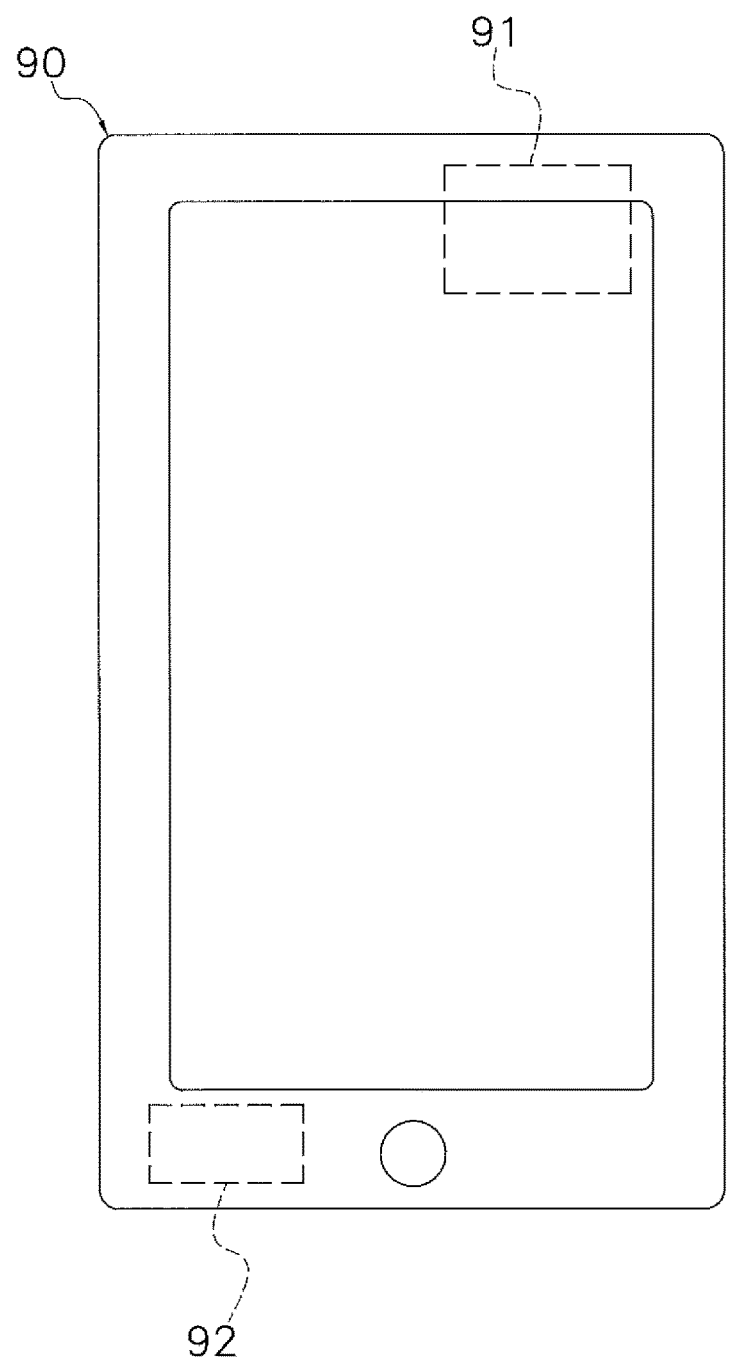
FIG. 2 is an external view of a terminal.

It is presumed that the terminal 90 here is an information processing terminal, such as a smartphone, a tablet PC or the like, equipped with an antenna for wireless communication such as shown in FIG. 2 (in FIG. 2, the antenna for wireless communication is represented by dashed lines indicated by reference sign "91"). It will be noted that the terminal 90 may also be another information processing device such as a laptop PC or the like. By installing an application downloaded from the management server 50 (described later), it becomes possible for the terminal 90 to perform wireless communication with the indoor unit 20 (more specifically, a remote controller 30) using a predetermined protocol and send commands for switching the operating state of the indoor unit 20.

Furthermore, the terminal 90 has a communication module including an antenna for near-field wireless communication and a reader/writer and has, in addition to the wireless communication function used when sending the commands, a near-field wireless communication function for sending information to and receiving information from the indoor unit 20 (more specifically, the remote controller 30). In FIG. 2, a communication module for near-field wireless communication is represented by dashed lines indicated by reference sign "92". In the present embodiment, the near-field wireless communication between the indoor unit 20 and the terminal 90 is performed by bringing the terminal 90 close to the later-described remote controller 30 (more specifically, a later-described communication module 38).

Here, it is presumed that the "wireless communication" in the present embodiment is wireless communication performed using a predetermined frequency (e.g., 2.4 GHz, 5 GHz or the like) in a wireless local area network (LAN), such as Wi-Fi (registered trademark), Bluetooth (registered trademark) or the like. Furthermore, "near-field wireless communication" is a communication standard such as near-field communication (NFC) or the like, and a communication method that enables two-way communication at a close distance of around several centimeters to around 1 meter using a frequency (e.g., 13.56 MHz or the like) different from that used in the wireless communication is presumed.

(1-1) Outdoor Unit 10

The outdoor unit 10 is installed outdoors (outside the utilization space SP). The outdoor unit 10 mainly has, as elements configuring the refrigerant circuit, devices such as plural refrigerant pipes, a compressor, a four-port switching valve, an outdoor heat exchanger, and an expansion valve (not shown in the drawings).

Furthermore, the outdoor unit 10 has an outdoor unit control component 11 that executes switching control that switches the actions of various actuators in the outdoor unit 10. The outdoor unit control component 11 is a microcomputer configured by a CPU, a memory and/or the like. The outdoor unit control component 11 is mounted on a substrate disposed in the outdoor unit 10. The outdoor unit control component 11 is electrically connected via a communication line cb1 to, and sends signals to and receives signals from, an indoor unit control component 21 (described later) of each indoor unit 20.

(1-2) Indoor Unit 20 (Air Conditioning Indoor Unit)

Figure 3:
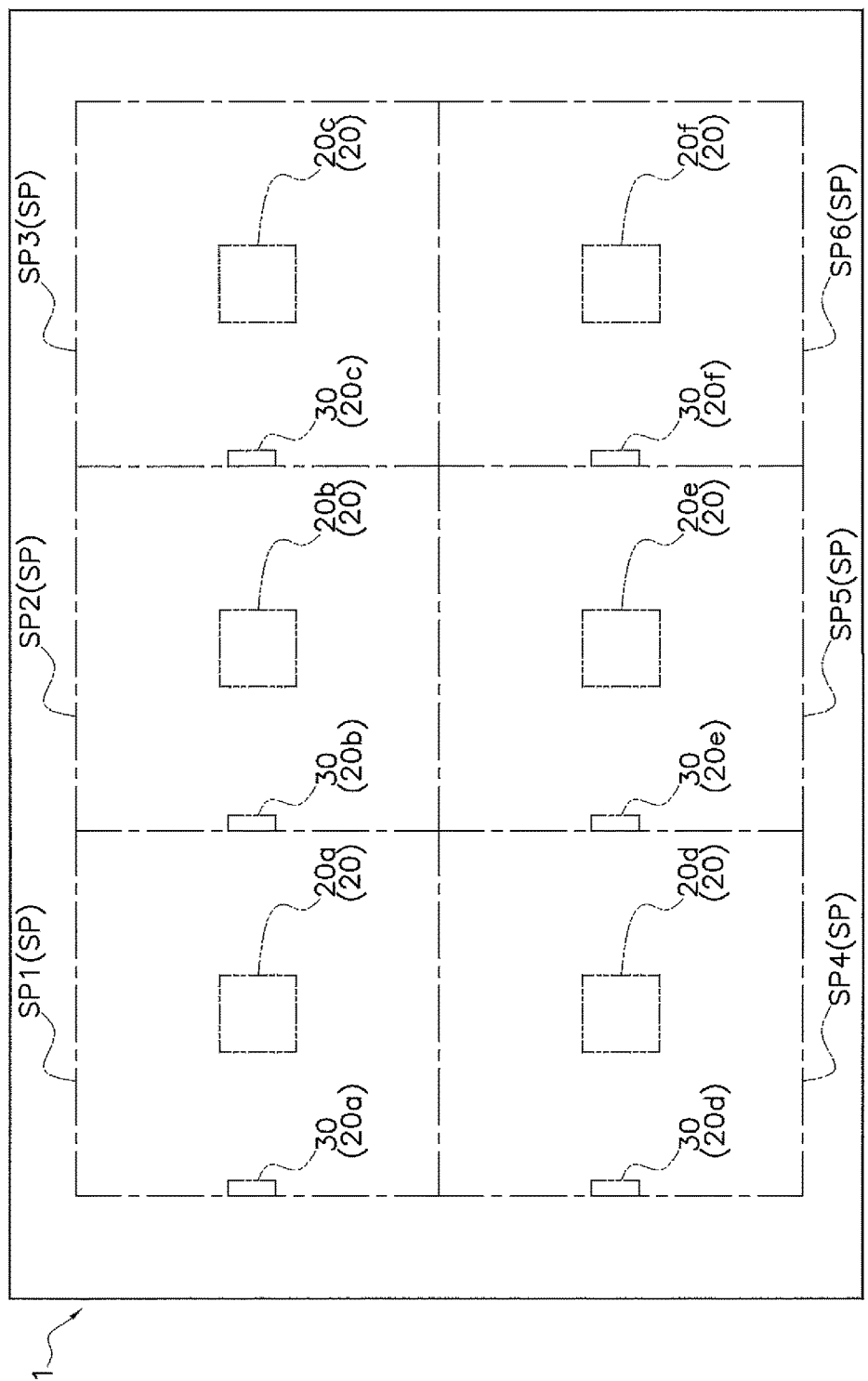
FIG. 3 is a schematic drawing generally showing how the indoor units are installed in a facility.
Figure 4:
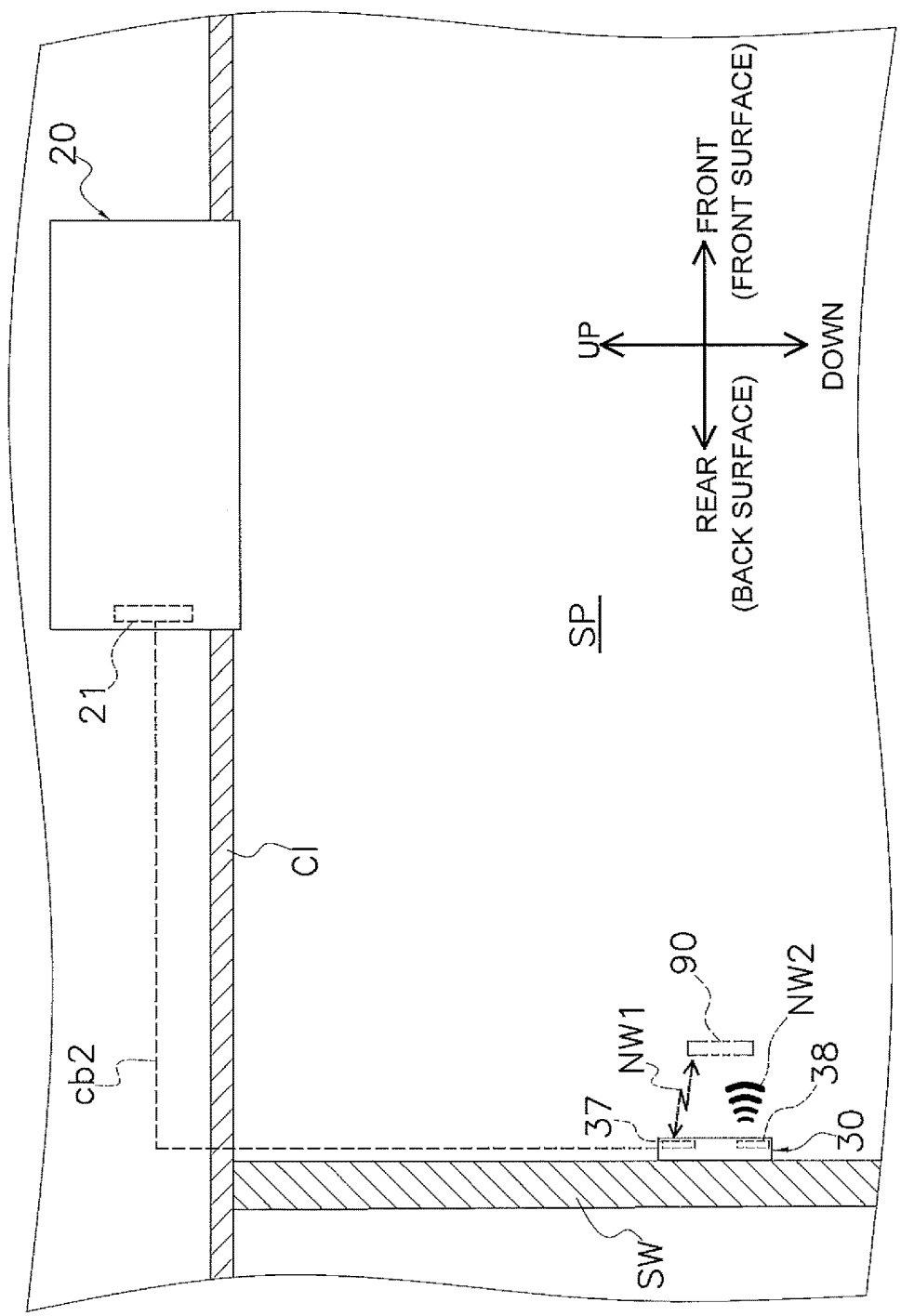
FIG. 4 is a schematic drawing generally showing how an indoor unit is installed in a utilization space.

FIG. 3 is a schematic drawing generally showing how the indoor units 20 are installed in the facility 1. FIG. 4 is a schematic drawing generally showing how each indoor unit 20 is installed in each utilization space SP.

The indoor unit 20 is an air conditioning indoor unit that is a ceiling-embedded type installed in a ceiling, a wall-mounted type installed on an inner wall, a floor-standing type installed on a floor surface of the utilization space SP, or the like. As shown in FIG. 3, one indoor unit 20 including a remote controller 30 is installed in each utilization space SP. In each utilization space SP, as shown in FIG. 4, each indoor unit 20 is installed with part (an air inlet and an air outlet) of its body section exposed from a ceiling CI.

Furthermore, each indoor unit 20 has an indoor unit control component 21 (an actuator drive component) that executes switching control that switches the actions of various actuators in the indoor unit 20. The indoor unit control component 21 is mounted on a substrate disposed in the indoor unit 20. The indoor unit control component 21 is electrically connected via the communication line cb1 to, and sends signals to and receives signals from, the outdoor unit control component 11. When a command is output from a remote controller control component 39 (described later), the indoor unit control component 21 transfers the command as needed to the outdoor unit control component 11.

Furthermore, each indoor unit 20 has a remote controller 30 serving as an input device. The remote controller 30 is a wired remote-control device and is electrically connected via a communication line cb2 to the indoor unit control component 21. The remote controller 30 is installed in the utilization space SP together with the indoor unit 20 body and is installed on an inner wall or the like in the room. As shown in FIG. 4, in the present embodiment, the remote controller 30 is installed via a mounting member (not shown in the drawings) to a side wall SW of the utilization space SP.

Furthermore, the remote controller 30 functions as a command input device for inputting to the air conditioning system 100 various commands for changing or switching setting items such as starting/stopping (operating and stopping) the air conditioning system 100, the operating mode, the set temperature, the set air volume, the set air direction, a timer setting, or the like. Specifically, it is possible to input various commands using predetermined input means (a later-described start/stop switching key 35 and touchscreen 36) provided in the remote controller 30.

Furthermore, the remote controller 30 includes a wireless communication adapter 37 for performing near-field wireless communication with the terminal 90. The remote controller 30 uses the wireless communication adapter 37 to form a wireless network NW1 and perform wireless communication with the terminal 90. Specifically, the remote controller 30 performs wireless communication with the terminal 90 in a state in which a communication connection with the terminal 90 has been established using the predetermined protocol.

Furthermore, the remote controller 30 has a near-field wireless communication module 38 including an antenna for near-field wireless communication and a reader/writer and can perform wireless communication with, and send information to and receive information from, the terminal 90. The remote controller 30 uses the near-field wireless communication module 38 to form a near-field wireless network NW2 and perform near-field wireless communication with the terminal 90.

Furthermore, the remote controller 30 also functions as a display device that displays the operating state of the air conditioning system 100 and setting items. For example, the remote controller 30 displays, by means of characters and/or graphics, setting items in the operating state, such as the operating mode of the indoor unit 20, the set temperature, the set air volume, the air direction, and the timer setting, the time, or the like. Furthermore, the remote controller 30 displays error display data (described later) that gives notification to the user that an error is occurring.

Details of the remote controller 30 will be described later in "(2) Details of Remote Controller 30."

(1-3) Management Server 50

The management server 50 is a computer including a CPU, a memory and the like. The management server 50 is, for example, disposed in a remote location away from the utilization space SP. The management server 50 is connected via a communication line cb3 to a wide area network NW3. The wide area network NW3 is a wide area network (WAN) such as the Internet or the like. The management server 50 can communicate with the terminal 90 via the wide area network NW3.

The management server 50 includes predetermined storage regions in memories such as a RAM, a ROM, a HDD or the like and stores an application program (hereinafter simply called "the application") for making the terminal 90 function as a command input device. When the management server 50 receives a predetermined signal (an application request signal) sent from the terminal 90, the management server 50 sends the application to the terminal 90 that sent the application request signal.

Because of this, the terminal 90 can download the application from the management server 50 via the wide area network NW3.

(2) Details of Remote Controller 30

Figure 5:
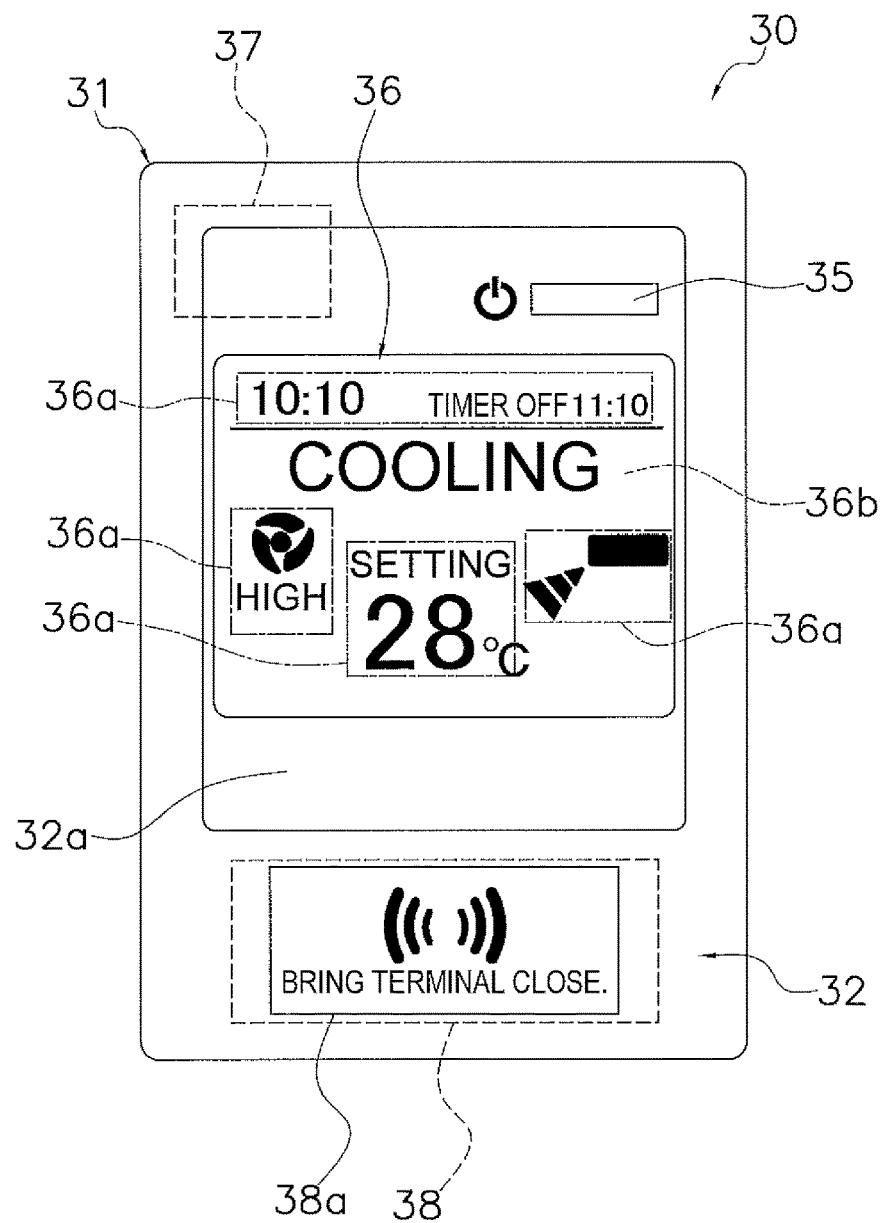
FIG. 5 is a front view of a remote controller at the time of installation.
Figure 5:
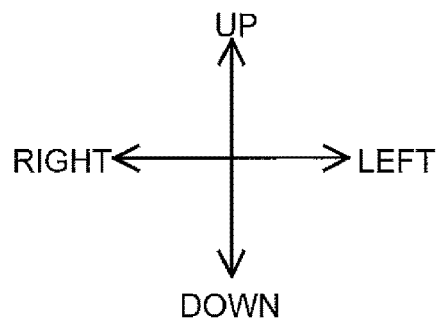

FIG. 5 is a front view of the remote controller 30 at the time of installation. The remote controller 30 has a casing 31 made of synthetic resin, for example. The casing 31 is a thin casing whose thickness is thinner than its height and width, and the casing 31 is substantially rectangular in shape as seen in a front view. The casing 31 includes a front surface portion 32 that faces the direction (forward direction) of the utilization space SP in a state in which the remote controller 30 is installed on the side wall SW. The casing 31 has a transparent cover 32a configured by glass, acrylic resin or the like. The cover 32a is disposed in the central section of the front surface portion 32.

Figure 6:
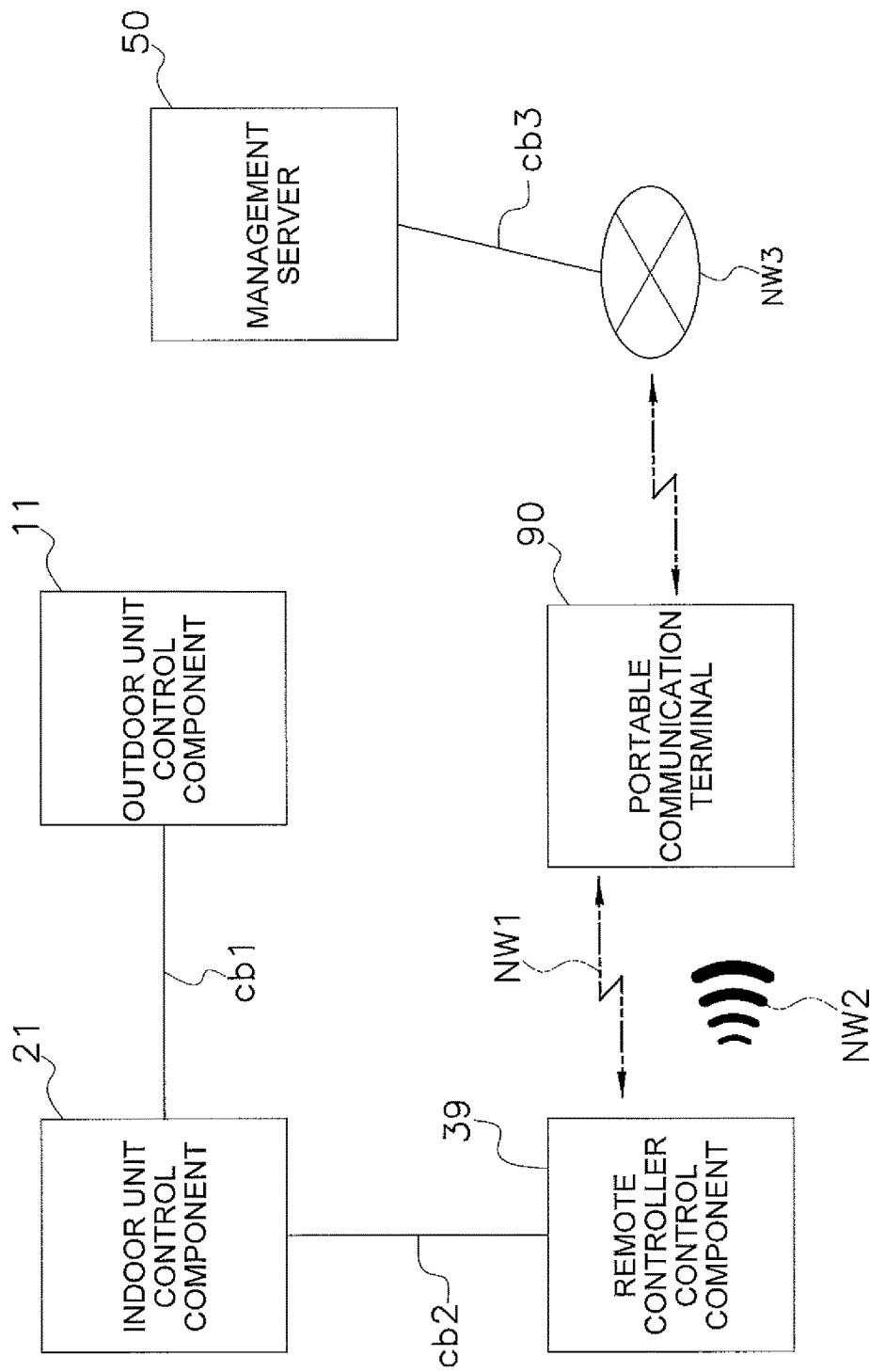
FIG. 6 is a schematic drawing generally showing communication networks constructed in the air conditioning system.
Figure 7:
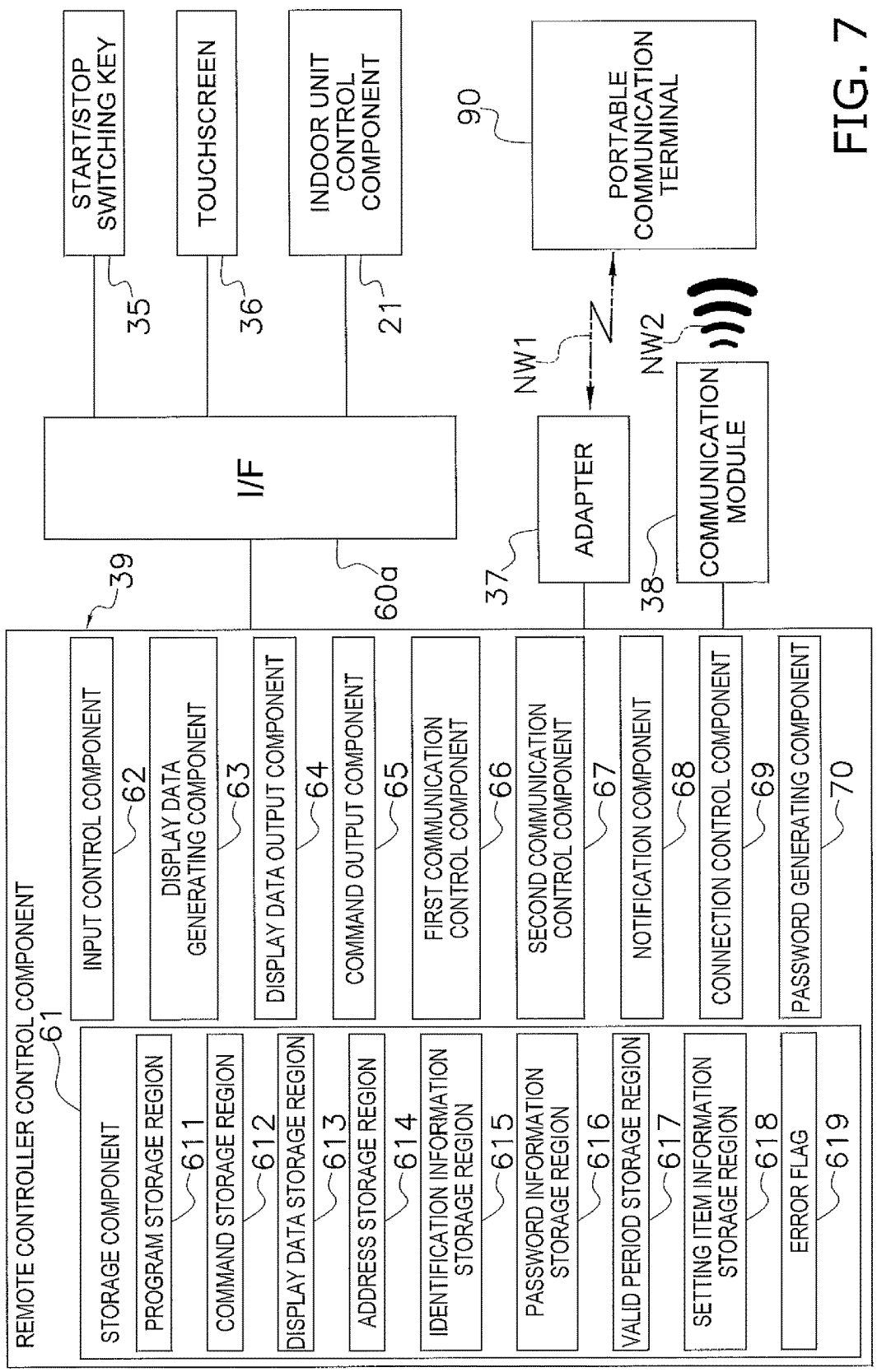
FIG. 7 is a block diagram generally showing the configuration of a remote controller control component and units connected to the remote controller control component.

The remote controller 30 mainly has, inside the casing 31, a start/stop switching key 35, a touchscreen 36, the wireless communication adapter 37, the near-field wireless communication module 38, and the remote controller control component 39 (FIG. 6, FIG. 7).

(2-1) Start/Stop Switching Key 35

The start/stop switching key 35 is a push button by which the user inputs a command to cause the air conditioning system 100 to start or stop operating. Specifically, when the start/stop switching key 35 is pushed down in a case where the air conditioning system 100 is in a stopped state, the air conditioning system 100 starts operating. Furthermore, when the start/stop switching key 35 is pushed down in a case where the air conditioning system 100 is in an operating state, the air conditioning system 100 stops.

The start/stop switching key 35 is disposed in the upper left portion of the front surface side of the casing 31. The start/stop switching key 35 includes a key top, which is exposed to the front surface side through an opening formed in the casing 31, and a physical key electrode portion, which is housed in the casing 31 (not shown in the drawings). The physical key electrode portion is connected to the remote controller control component 39, and when the start/stop switching key 35 is pushed down, a predetermined signal is output to the remote controller control component 39.

(2-2) Touchscreen 36

The touchscreen 36 is disposed in the central section of the front surface side of the remote controller 30. The touchscreen 36 functions as an input means for inputting various commands in the remote controller 30. Specifically, the touchscreen 36 has plural touch input portions 36a. The touch input portions 36a are associated with various setting items, and the user can input desired commands by touching the corresponding touch input portion 36a with a finger, a stylus pen or the like. For example, by touching the corresponding touch input portions 36a, the user can perform settings such as the set temperature, the set air volume, the air direction, the time, switch ON/OFF a timer function, or the like.

Furthermore, the touchscreen 36 also functions as a display means that displays various types of information. Specifically, the touchscreen 36 has a display portion 36b that has a full dot matrix liquid crystal display and a backlight. The display portion 36b displays, superimposed on the touch input portions 36a, predetermined icons and information in an operating state. This display allows the user to recognize the various commands associated with the touch input portions 36a. Furthermore, when various errors occur, the display portion 36b displays error display data generated in order to give notification to the user that an error has occurred. This allows the user to grasp the error that has occurred.

(2-3) Wireless Communication Adapter 37 (Command Receiving Component)

The wireless communication adapter 37 (hereinafter simply called "the adapter 37") is a network adapter that establishes a one-to-one communication connection between the remote controller 30 and the terminal 90, and enables wireless communication resulting from an access point mode between the remote controller 30 and the terminal 90. That is, the adapter 37 is a functional component for constructing the wireless network NW1 between the indoor unit 20 and the terminal 90.

A unique device identifier (e.g., device-specific information such as a MAC address or the like) is stored in the adapter 37. The device identifier becomes information that uniquely identifies the adapter 37. It will be noted that because one adapter 37 is disposed in the remote controller 30, the device identifier of the adapter 37 functions as identification information that uniquely identifies the remote controller 30 (the indoor unit 20). The adapter 37 is disposed on the upper side of the touchscreen 36 in the casing 31.

(2-4) Near-field Wireless Communication Module 38

The near-field wireless communication module 38 (hereinafter simply called "the communication module 38") is a unit for performing near-field wireless communication between the remote controller 30 and the portable communication terminal 90. When the communication module 38 is approached by the communication module 92 of the terminal 90, the communication module 38 generates a magnetic field and produces an induced current in the antenna in the communication module 92 of the terminal 90. Because of this, the near-field wireless network NW2 is formed and it becomes possible to exchange information (read and write data) by near-field wireless communication between the remote controller 30 and the terminal 90.

The communication module 38 is disposed on the lower side of the touchscreen 36 in the casing 31. A label 38a having a predetermined mark and text printed on it is adhered to the front surface portion 32 of the casing 31 in a position superimposed on the communication module 38 as seen in a front view so that it is easy for the user to grasp the position of the communication module 38 when performing near-field wireless communication between the terminal 90 and the remote controller 30 (i.e., when bringing the terminal 90 close to the communication module 38).

(2-5) Remote Controller Control Component 39

The remote controller control component 39 includes a microcomputer configured by a CPU, a memory and the like. The remote controller control component 39 is mounted on a substrate disposed in the casing 31. The remote controller control component 39 is connected via the communication line cb2 to the indoor unit control component 21, receives a supply of electrical power, and sends signals to and receives signals from the indoor unit control component 21. Furthermore, the remote controller control component 39 is connected via wires to the start/stop switching key 35 and the touchscreen 36 (the touch input portions 36a and the display portion 36b), and when commands are input to the start/stop switching key 35 and the touch input portions 36a, the remote controller control component 39 accepts those commands and outputs them to the indoor unit control component 21. Furthermore, the remote controller control component 39 generates display data in accordance with the situation and displays on the display portion 36b an icon representing the operating state and various types of information.

Furthermore, the remote controller control component 39 is connected via a wire to the adapter 37 and performs wireless communication with the terminal 90 via the adapter 37. Furthermore, the remote controller control component 39 is connected via a wire to the communication module 38 and performs near-field wireless communication with the terminal 90 via the communication module 38.

(3) Networks Constructed in Air Conditioning System 100

FIG. 6 is a schematic drawing generally showing the communication networks constructed in the air conditioning system 100. In the air conditioning system 100, the outdoor control component 11 and the indoor unit control component 21 are interconnected by the communication line cb1, and the indoor unit control component 21 and the remote controller control component 39 are interconnected by the communication line cb2. Furthermore, the remote controller control component 39 forms the wireless network NW1 with the terminal 90 and performs wireless communication with the terminal 90. Furthermore, the remote controller control components 39 forms the near-field wireless network NW2 with the terminal 90 and performs near-field wireless communication with the terminal 90. Furthermore, the management server 50 is connected to the wide area network NW3 by the communication line cb3 and can communicate with the terminal 90 via the wide area network NW3. It will be noted that the terminal 90 is connectable to the wide area network NW3 using the antenna 91.

(4) Details of Remote Controller Control Component 39

FIG. 7 is a block diagram generally showing the configuration of the remote controller control component 39 and units connected to the remote controller control component 39.

The remote controller control component 39 is electrically connected via an interface 60a to the indoor unit control component 21, the start/stop switching key 35, and the touchscreen 36. Furthermore, the remote controller control component 39 is electrically connected to the adapter 37 by a wire so that it can perform wireless communication with the portable communication terminal 90 via the adapter 37. Furthermore, the remote controller control component 39 is electrically connected to the communication module 38 by a wire so that it can perform wireless communication with the portable communication terminal 90 via the communication module 38.

The remote controller control component 39 mainly includes functional components such as a storage component 61, an input control component 62, a display data generating component 63, a display data output component 64, a command output component 65, a first communication control component 66, a second communication control component 67, a notification component 68, a connection control component 69, a password generating component 70 and the like.

(4-1) Storage Component 61 (Specific Information Storage Component, Manager Password Storage Component, User Password Storage Component)

The storage component 61 is configured by memories such as a ROM, a RAM and/or the like included in the remote controller control component 39 and has plural storage regions. Specifically, the storage component 61 has a program storage region 611, a command storage region 612, a display data storage region 613, an address storage region 614, an identification information storage region 615, a password information storage region 616, a valid period storage region 617, a setting item information storage region 618, and an error flag 619.

In the program storage region 611 is stored a control program in which are defined various processes executed in each component of the remote controller control component 39.

In the command storage region 612 are stored signals that are input to the remote controller control component 39. For example, in the command storage region 612 are stored commands that have been input to the start/stop switching key 35 and the touchscreen 36. Furthermore, in the command storage region 612 are stored commands that have been received in the adapter 37.

The display data storage region 613 stores display data that have been generated by the display data generating component 63.

The address storage region 614 stores a communication address of the management server 50 in the wide area network NW3. More specifically, the address storage region 614 stores a communication address (hereinafter called "the application address") that specifies the storage region where the application is stored in the memory included in the management server 50. The application address is stored in the address storage region 614 beforehand by the manager.

The identification information storage region 615 stores identification information of the remote controller control component 39 (the remote controller 30). It will be noted that the identification information is one of information requested of the terminal 90 when establishing a communication connection with the terminal 90.

The password information storage region 616 stores password information requested, together with the identification information, of the terminal 90 when establishing a communication connection with the terminal 90. The password information is data having a predetermined number of bits. More specifically, the password information storage region 616 individually stores manager password information, which is requested of the terminal 90 when establishing a communication connection (manager connection) with the terminal 90 of the manager, and user password information, which is requested when establishing a communication connection (user connection) with the terminal 90 of a general user other than the manager. It will be noted that the manager password information is set beforehand by the manager and stored in the password information storage region 616. Furthermore, the user password information is generated (updated) at a predetermined timing by the password generating component 70 and stored in the password information storage region 616.

The valid period storage region 617 stores a valid period (operable period) for the communication connection that is set when establishing a communication connection with the terminal 90. The valid period is set beforehand by the manager and stored in the valid period storage region 617. It will be noted that in the present embodiment the valid period is set to 24 hours.

In the setting item information storage region 618 is stored information (setting item information) relating to commands permitted to be accepted (hereinafter called "permitted commands") and commands prohibited from being accepted (hereinafter called "prohibited commands") when establishing a communication connection (user connection) with the terminal 90 of a general user. Specifically, in the setting item information storage region 618, a setting item table TB1 such as shown in FIG. 8, for example, is stored as the setting item information. In the setting item table TB1, the permitted commands and the prohibited commands are defined per utilization space SP (i.e., per indoor unit 20). In the setting item table TB1 shown in FIG. 8, in relation to the utilization space SP1, "switch between starting/stopping" (i.e., switch between operating/stopping) the indoor unit 20, "select set temperature," "select set air volume," and "select set air direction" are defined as permitted commands and "switch operating mode" is defined as a prohibited command. In this way, in the setting item table TB1, setting items (permitted items) that can be switched by the terminal 90 of a general user are specified as permitted commands, and setting items that are prohibited from being switched by the terminal 90 of a general user are specified as prohibited commands. The permitted commands and the prohibited commands are set by the manager and defined in the setting item table TB1.

The error flag 619 is a flag for identifying the presence/absence of various errors (e.g., an error resulting from the valid period for the communication connection having expired, an error resulting from a prohibited command having been sent from the terminal 90, etc.). The error flag 619 has predetermined bits set in accordance with the type of error that has occurred.

(4-2) Input Control Component 62

The input control component 62 stores, in the command storage region 612, commands that have been input to the start/stop switching key 35 and the touchscreen 36.

(4-3) Display Data Generating Component 63

The display data generating component 63 generates display data to be displayed on the touchscreen 36 in accordance with the situation. In particular, when the error flag 619 is set, the display data generating component 63 generates predetermined display data (error display data) in order to give notification to the user that an error has occurred. The display data generating component 63 stores the generated display data in the display data storage region 613.

Figure 9:
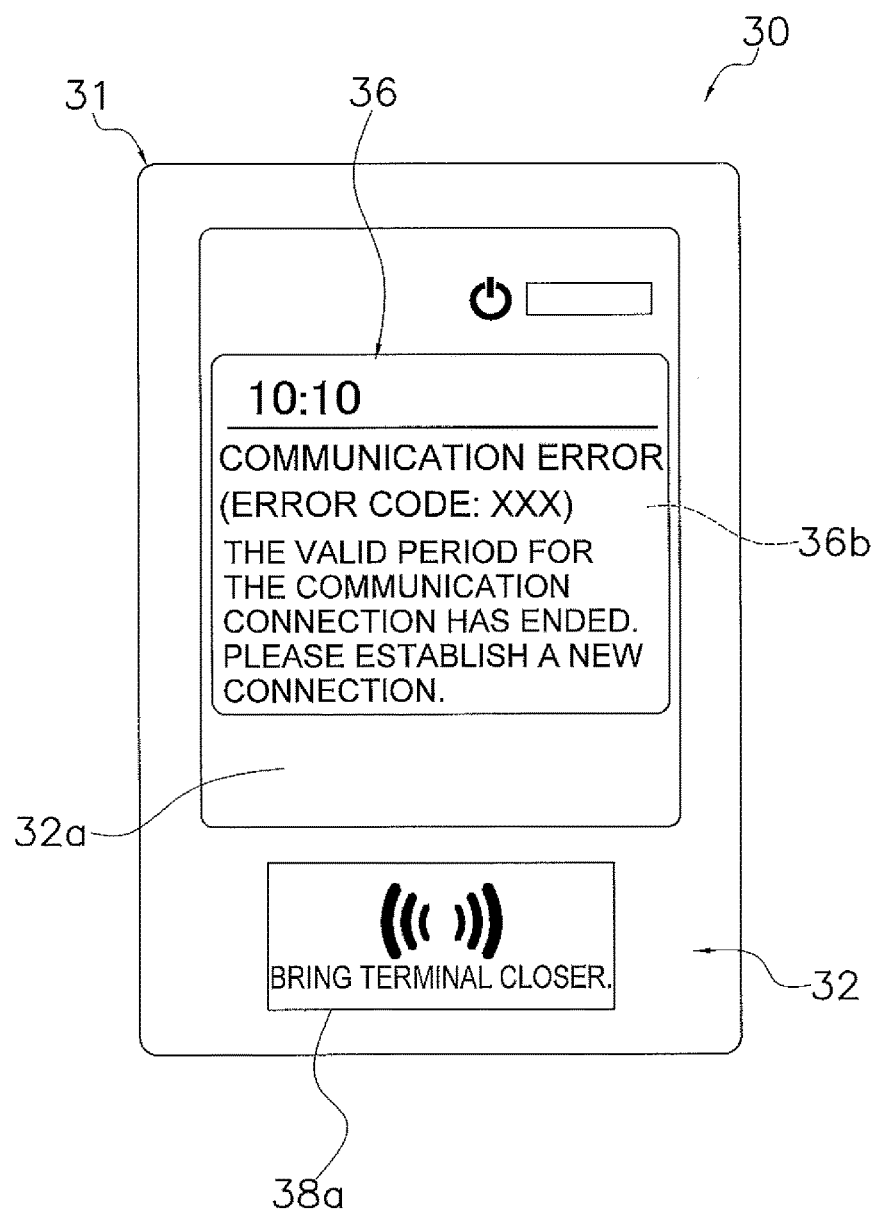
FIG. 9 is a schematic drawing showing an example when error display data are displayed on the remote controller.

It will be noted that the display data generating component 63 generates the error display data in accordance with the type of error that has occurred. For example, when an error occurs as a result of having received a command (hereinafter called an "invalid command") from the terminal 90 (hereinafter called a "time-out terminal 90") for which the valid period for the communication connection has ended, the display data generating component 63 generates the error display data in such a way that a display such as shown in FIG. 9 is performed on the touchscreen 36. In FIG. 9, text indicating the fact that an error has occurred and an error code identifying the type of error, and text prompting the establishment of a new communication connection in association with the valid period for the communication connection having ended, are displayed on the touchscreen 36. Because of this, the user who input the command with the error terminal 90 while staying in the utilization space SP becomes prompted to perform work pertaining to establishing a new communication connection (user connection).

(4-4) Display Data Output Component 64

The display data output component 64 outputs to the touchscreen 36 (the display portion 36b) the display data newly stored in the display data storage region 613 and displays the display data on the touchscreen 36.

(4-5) Command Output Component 65

The command output component 65 outputs to the indoor unit control component 21 the command stored in the command storage region 612.

(4-6) First Communication Control Component 66

The first communication control component 66 is a functional component that controls the wireless communication with the terminal 90 via the adapter 37. The first communication control component 66 realizes wireless communication with the terminal 90 by sending and receiving signals using a predetermined protocol. The first communication control component 66 refers to valid period information (operable period information) included in the signal sent from the terminal 90 and, in a case where a communication end timing (described later) has passed, nullifies, without storing in the command storage region 612, the command (invalid command) sent from the terminal 90 (the time-out terminal 90) and sets the error flag 619.

Furthermore, the first communication control component 66 refers to the setting item information stored in the setting item information storage region 618 and, in a case where the command included in the signal sent from the terminal 90 is a prohibited command, nullifies, without storing in the command storage region 612, the received prohibited command and sets the error flag 619.

(4-7) Second Communication Control Component 67

The second communication control component 67 is a functional component that controls the near-field wireless communication with the terminal 90 via the communication module 38. The second communication control component 67 realizes the near-field wireless communication with the terminal 90 by sending and receiving signals using a predetermined protocol.

(4-8) Notification Component 68 (Specific Information Notification Component)

The notification component 68 is a functional component which, upon receiving a predetermined signal (address request signal) from the terminal 90 by near-field wireless communication via the communication module 38, gives notification to the terminal 90 of the application address. Specifically, when the notification component 68 receives the address request signal, the notification component 68 acquires the application address of the management server 50 from the address storage region 614 and sends the acquired application address to the terminal 90 by near-field wireless communication via the communication module 38. More specifically, the notification component 68 sends a uniform resource locator (URL) corresponding to the application address.

Furthermore, the notification component 68 is a functional component which, upon receiving a predetermined signal (connection information request signal) from the terminal 90 by near-field wireless communication via the communication module 38, gives notification to the terminal 90 of connection information. The connection information is information requested of the terminal 90 when establishing a communication connection between the remote controller 30 and the terminal 90, and specifically is information including the identification information stored in the identification information storage region 615 and the password information stored in the password information storage region 616. When the notification component 68 receives the connection information request signal, the notification component 68 acquires the identification information from the identification information storage region 615, acquires the password information (more specifically, the user password information) from the password information storage region 616, and sends the identification information and the password information as the "connection information" to the terminal 90 by near-field wireless communication via the communication module 38.

It will be noted that, in the following description, the connection information and the valid period information will collectively be called "specific information."

(4-9) Connection Control Component 69 (Judgment Component)

The connection control component 69 is a functional component which, upon receiving a predetermined signal (connection request signal) from the terminal 90 by wireless communication via the adapter 37, establishes a communication connection with the terminal 90. Specifically, in a case where the connection information of which notification was given is not included in the received connection request signal, the connection control component 69 does not establish a communication connection with the terminal 90 that sent the connection request signal. In case where the connection information of which notification was given is included in the received connection request signal, the connection control component 69 establishes a communication connection with the terminal 90 that sent the connection request signal. That is, the connection control component 69 performs a judgment of whether or not to establish a communication connection with the terminal 90 on the basis of the presence/absence (or correctness/incorrectness) of the connection information included in the request signal sent from the terminal 90.

More specifically, in a case where the manager password information is included as the connection information in the received connection request signal, the connection control component 69 establishes a manager-use communication connection (manager connection). In a case where the user password information is included as the connection information in the received connection request signal, the connection control component 69 establishes a general user-use communication connection (user connection). That is, the manager connection is a communication connection established between the terminal 90 retained by the manager and the remote controller 30, and the user connection is a communication connection established between the terminal 90 retained by a general user other than the manager and the remote controller 30.

When establishing a communication connection (user connection) with the terminal 90, the connection control component 69 sets the valid period for the communication connection (in other words, the period in which the terminal 90 will function as a command input device). Specifically, the connection control component 69 sets, as a communication start timing, the time when the communication connection (user connection) was established. The connection control component 69 also refers to the valid period stored in the valid period storage region 617 and sets, as a communication end timing, a timing obtained by adding the valid period to the communication start timing (i.e., a timing at which the valid period will expire after the communication start timing). The connection control component 69 sends, to the terminal 90, the valid period information (operable period information) specifying the communication start timing and the communication end timing that have been set.

It will be noted that the communication start timing can also be called the timing at which it becomes possible for the operating state to be switched by the terminal 90 to which notification of the valid period information was given. Furthermore, the communication end timing can also be called the timing at which it becomes impossible for the operating state to be switched by the terminal 90 to which notification of the valid period information was given.

(4-10) Password Generating Component 70

The password generating component 70 periodically generates new user password information and stores the generated user password information in the password information storage region 616. In the present embodiment, the password generating component 70 generates new user password information (i.e., updates the user password information stored in the password information storage region 616) each time the valid period stored in the valid period storage region 617 expires.

(5) Flow of Processes Performed by Remote Controller Control Component 39

Figure 10:
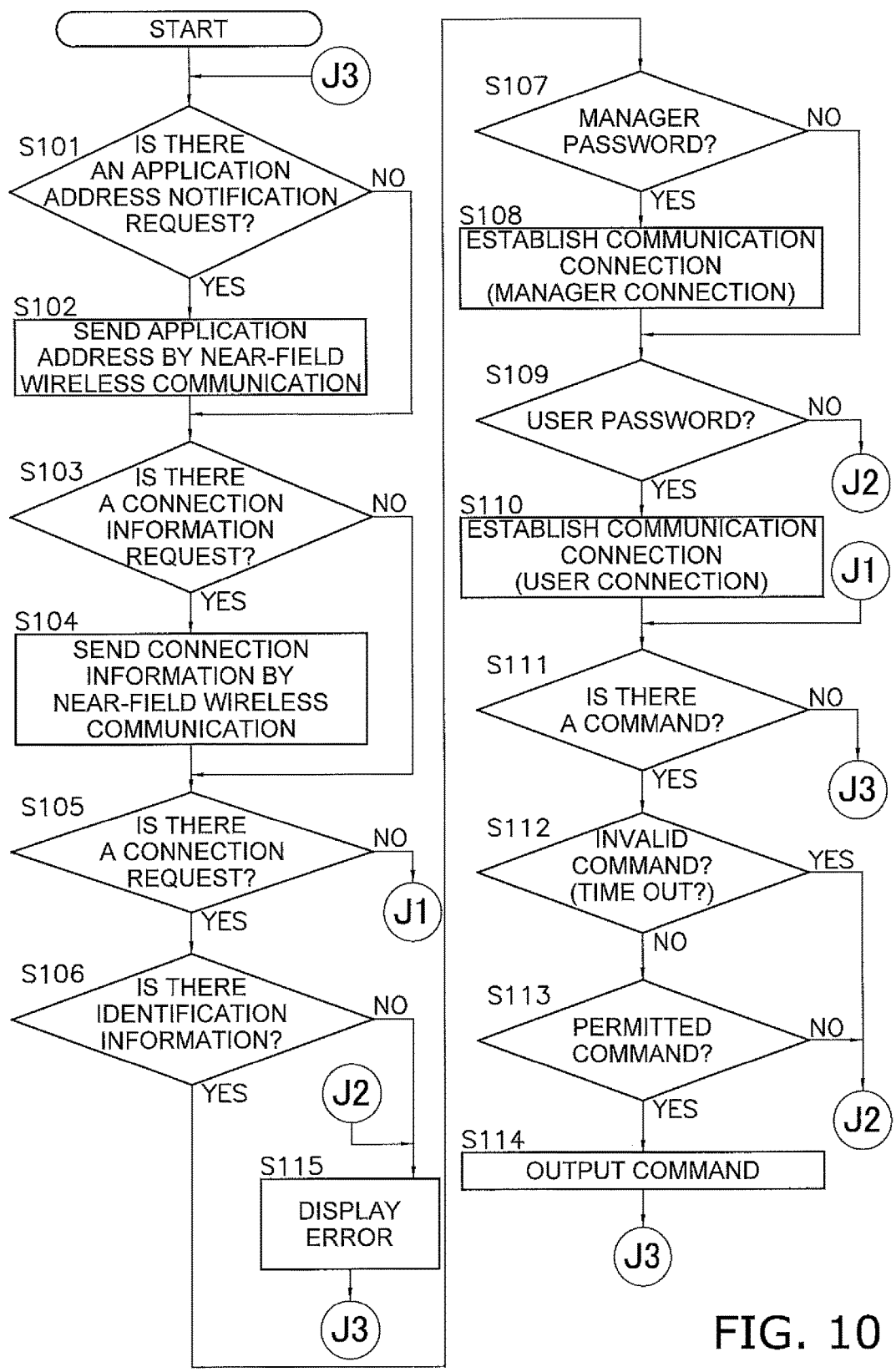
FIG. 10 is a flowchart showing an example of a flow of processes performed by the remote controller control component.

An example of a flow of processes performed by the remote controller control component 39 will be described below with reference to FIG. 10. FIG. 10 is a flowchart showing an example of a flow of processes performed by the remote controller control component 39.

In the air conditioning system 100, the remote controller control component 39 executes processes by the flow shown in step S101 to step S115 of FIG. 10. It will be noted that the flow of processes shown in FIG. 10 can be appropriately changed, so that as long as the processes are properly performed, the order of any of the steps may be switched, and any of the steps may be performed at the same time.

In step S101, in a case where the remote controller control component 39 has not received an application address notification request signal from the terminal 90 by near-field wireless communication (i.e., in the case of "NO"), the remote controller control component 39 proceeds to step S103. In a case where the remote controller control component 39 has received an application address notification request signal from the terminal 90 by near-field wireless communication (i.e., in the case of "YES"), the remote controller control component 39 proceeds to step S102.

In step S102, the remote controller control component 39, having received the application address notification request signal from the terminal 90, sends to the terminal 90 the application address of the management server 50 by near-field wireless communication. Thereafter, the remote controller control component 39 proceeds to step S103.

In step S103, in a case where the remote controller control component 39 has not received the connection information request signal from the terminal 90 by near-field wireless communication (i.e., in the case of "NO"), the remote controller control component 39 proceeds to step S105. In a case where the remote controller control component 39 has received the connection information request signal from the terminal 90 by near-field wireless communication (i.e., in the case of "YES"), the remote controller control component 39 proceeds to step S104.

In step S104, having received the connection information request signal from the terminal 90, the remote controller control component 39 sends to the terminal 90 the connection information (the identification information of the remote controller 30 and the user password information) by near-field wireless communication. Thereafter, the remote controller control component 39 proceeds to step S105.

In step S105, in a case where the remote controller control component 39 has not received the connection request signal from the terminal 90 by wireless communication (i.e., in the case of "NO"), the remote controller control component 39 proceeds to step S111. In a case where the remote controller control component 39 has received the connection request signal from the terminal 90 by wireless communication (i.e., in the case of "YES"), the remote controller control component 39 proceeds to step S106.

In step S106, in a case where the identification information of which notification was given is not included in the received connection request signal (i.e., in the case of "NO"), the remote controller control component 39 proceeds to step S115 without establishing a communication connection with the terminal 90 that sent the connection request signal. In a case where the identification information of which notification was given is included in the received connection request signal (i.e., in the case of "YES"), the remote controller control component 39 proceeds to step S107.

In step S107, in a case where the manager password information is not included as the connection information in the received connection request signal (i.e., in the case of "NO"), the remote controller control component 39 proceeds to step S109. In a case where the manager password information is included as the connection information in the received connection request signal (i.e., in the case of "YES"), the remote controller control component 39 proceeds to step S108.

In step S108, in response to the manager password information being included as the connection information in the received connection request signal, the remote controller control component 39 establishes the manager-use communication connection (manager connection) with the terminal 90 that sent the connection request signal. Thereafter, the remote controller control component 39 proceeds to step S109.

In step S109, in a case where the user password information is not included as the connection information in the received connection request signal (i.e., in the case of "NO"), the remote controller control component 39 proceeds to step S115. In a case where the user password information is included as the connection information in the received connection request signal (i.e., in the case of "YES"), the remote controller control component 39 proceeds to step S110.

In step S110, in response to the user password information being included as the connection information in the received connection request signal, the remote controller control component 39 establishes the general user-use communication connection (user connection) with the terminal 90 that sent the connection request signal. Thereafter, the remote controller control component 39 proceeds to step S111.

In step S111, in a case where a command has not been input to the start/stop switching key 35 or the touchscreen 36 and the remote controller control component 39 has not received a command from the terminal 90 by wireless communication (i.e., in the case of "NO"), the remote controller control component 39 returns to step S101. In a case where a command has been input to the start/stop switching key 35 or the touchscreen 36 or in a case where the remote controller control component 39 has received a command from the terminal 90 by wireless communication (i.e., in the case of "YES"), the remote controller control component 39 proceeds to step S112.

In step S112, in a case where the command received in step S111 is an invalid command sent from a time-out terminal 90 (i.e., in the case of "YES"), the remote controller control component 39 proceeds to step S115. In a case where the command received in step S111 is not an invalid command sent from a time-out terminal 90 (i.e., in the case of "NO"), the remote controller control component 39 proceeds to step S113. It will be noted that, although it is not shown in the drawings, in step S111, in a case where a command was input via the start/stop switching key 35 or the touchscreen 36 and in a case where a command was sent from the terminal 90 for which the manager connection was established (i.e., the terminal 90 of the manager), the remote controller control component 39 proceeds to step S114.

In step S113, in a case where the command received in step S111 is not a permitted command, which is to say a prohibited command (i.e., in the case of "NO"), the remote controller control component 39 proceeds to step S115. In a case where the command received in step S111 is a permitted command (i.e., in the case of "YES"), the remote controller control component 39 proceeds to step S114.

In step S114, the remote controller control component 39 outputs the received command to the indoor unit control component 21 (or the outdoor unit control component 11). Thereafter, the remote controller control component 39 returns to step S101.

In step S115, the remote controller control component 39 outputs to and displays on the touchscreen 36 the predetermined error display data in order to give notification to the user that an error has occurred (e.g., that the valid period for the communication connection has expired, or that a prohibited command was sent from the terminal 90). Thereafter, the remote controller control component 39 returns to step S101.

(6) Flow of Processes in Air Conditioning System 100

Figure 11:
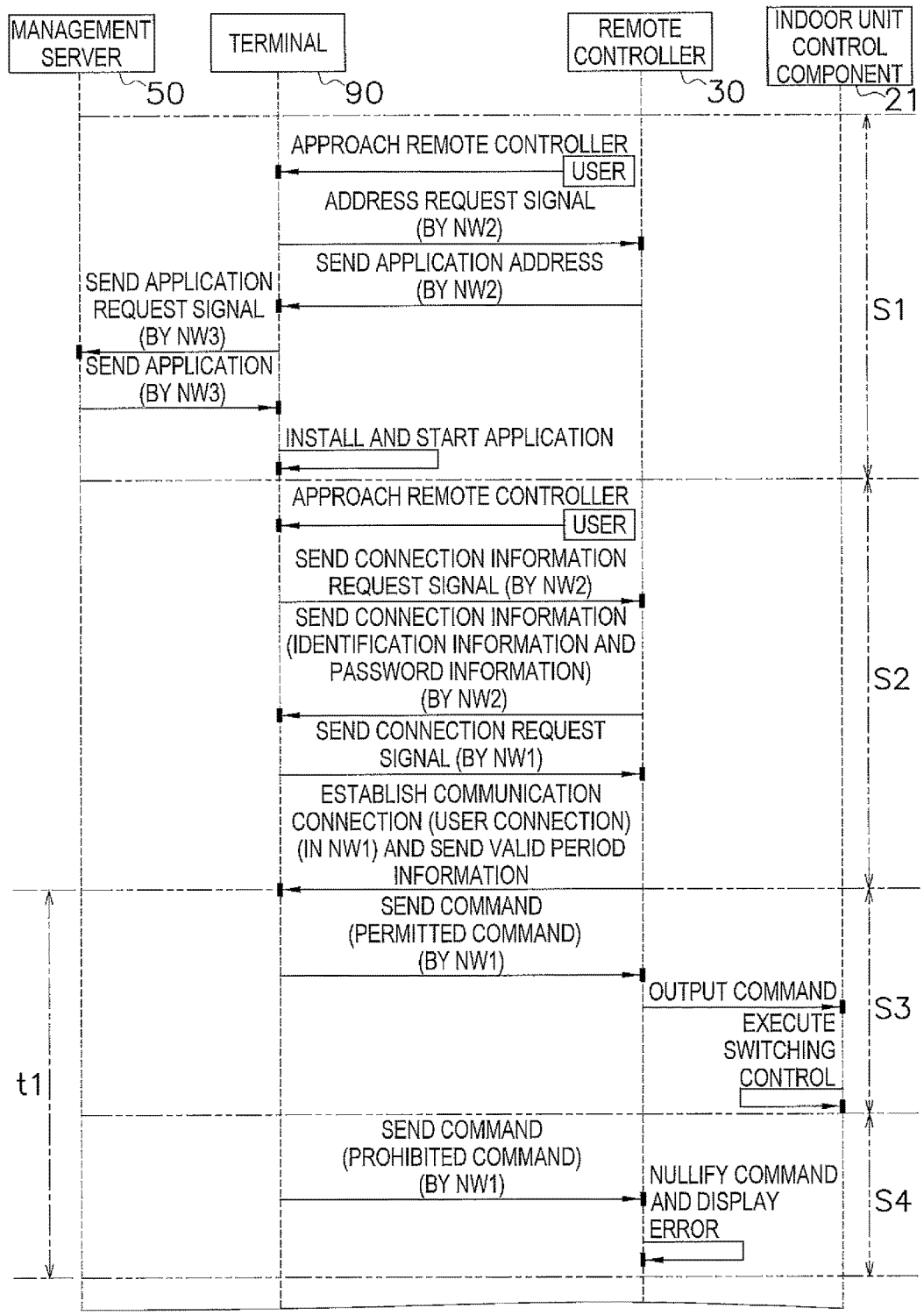
FIG. 11 is a sequence diagram schematically showing an example of processes performed by an indoor unit control component, the remote controller, a management server, and a terminal in the air conditioning system.
Figure 12:
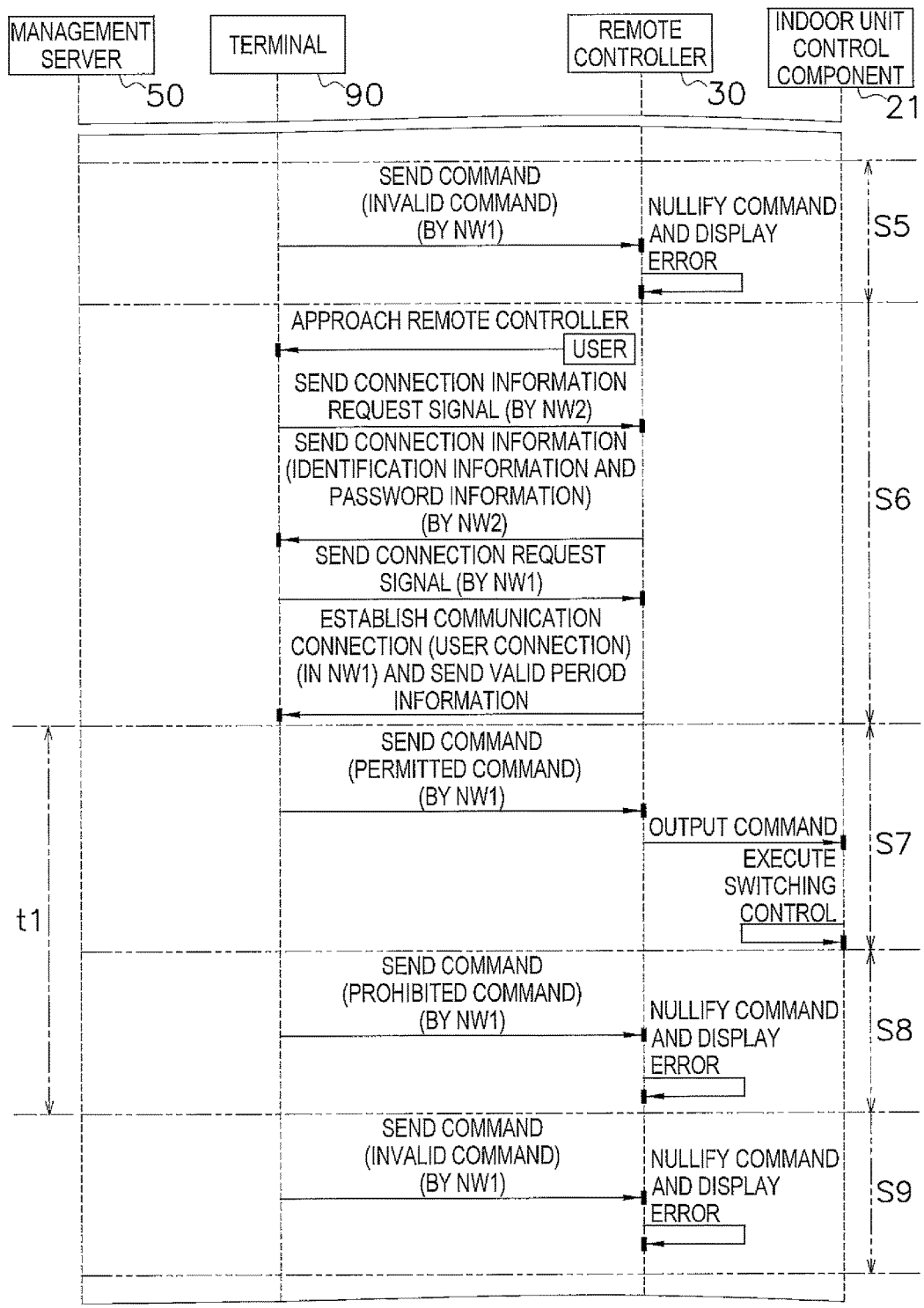
FIG. 12 is a sequence diagram schematically showing an example of processes performed by the indoor unit control component, the remote controller, the management server, and the terminal in the air conditioning system.

FIG. 11 and FIG. 12 are sequence diagrams schematically showing an example of processes performed by the indoor unit control component 21, the remote controller 30, the management server 50, and the terminal 90 in the air conditioning system 100. In FIG. 11 are shown processes performed by each part from period S1 to period S4. In FIG. 12 are shown processes performed by each part from period S5 to period S9.

(6-1) Period S1

In period S1 of FIG. 11 is shown a flow until the terminal 90 installs and starts the application.

First, when the terminal 90 retained by the user is brought close to the remote controller 30 (the communication module 38), the near-field wireless network NW2 is formed and near-field wireless communication is started between the terminal 90 and the remote controller 30, and the address request signal is sent from the terminal 90 to the remote controller 30. The remote controller 30 that has received the address request signal from the terminal 90 sends, via the near-field wireless network NW2, the application address to the terminal 90 that sent the address request signal.

The terminal 90 that has received the application address sent from the remote controller 30 accesses the application address via the wide area network NW3 and sends the application request signal to the management server 50. The management server 50 that has received the application request signal sends the application via the wide area network NW3 to the terminal 90 that sent the application request signal. That is, the application is downloaded from the management server 50 to the terminal 90. The terminal 90 that has downloaded the application from the management server 50 installs and starts the application.

(6-2) Period S2

In period S2 of FIG. 11 is shown a flow until the communication connection (user connection) is established between the terminal 90 and the remote controller 30 after the terminal 90 has started the application.

When the user brings the terminal 90 in which the application has been started close to the remote controller 30 (the communication module 38), the near-field wireless network NW2 is formed and near-field wireless communication is started between the terminal 90 and the remote controller 30, and the connection information request signal is sent from the terminal 90 to the remote controller 30. The remote controller 30 that has received the connection information request signal from the terminal 90 sends, via the near-field wireless network NW2, the connection information (the identification information and the user password information) to the terminal 90 that sent the connection information request signal.

The terminal 90 that has received the connection information sent from the remote controller 30 sends, by wireless communication (i.e., via the wireless network NW1) to the remote controller 30, the connection request signal including the received identification information and user password information. In a case where the identification information and the user password information included in the connection request signal are correct (i.e., in a case where they coincide with the identification information and the user password information of which notification was given), the remote controller 30 that has received the connection request signal sends a predetermined authentication signal to the terminal 90 that sent the connection request signal and establishes a communication connection (user connection) in the wireless network NW1. At this time, the remote controller 30 sends the valid period information to the terminal 90 via the wireless network NW1.

(6-3) Period S3

In period S3 of FIG. 11 is shown a flow until a command (a permitted command) from the terminal 90 is accepted after the communication connection (user connection) is established between the terminal 90 and the remote controller 30. It will be noted that "t1" in periods S3 and S4 represents the valid period pertaining to the valid period information that was sent to the terminal 90.

When the user inputs a command (a permitted command) to the terminal 90 and sends the command to the remote controller 30 via the wireless network NW1, the remote controller 30 receives the command and determines whether or not the command is a permitted command and whether or not the terminal 90 that sent the command is a time-out terminal 90 (i.e., whether or not the terminal 90 that sent the command is a terminal 90 for which the valid period of which notification was given has expired). Additionally, if the received command is a permitted command and is a command sent from a terminal 90 for which the valid period of which notification was given has not expired, the remote controller 30 outputs the command to the indoor unit control component 21. Because of this, the permitted command sent from the terminal 90 with the valid communication connection is sent to the indoor unit control component 21, and the switching control of the various actuators according to the content of the permitted command is executed in the indoor unit control component 21 and the outdoor unit control component 11.

(6-4) Period S4

In period S4 of FIG. 11 is shown a flow until a command (a prohibited command) sent from the terminal 90 is nullified after the communication connection (user connection) is established between the terminal 90 and the remote controller 30.

When the user inputs a command (a prohibited command) to the terminal 90 and sends the command to the remote controller 30 via the wireless network NW1, the remote controller 30 receives the command and determines whether or not the command is a permitted command and whether or not the terminal 90 that sent the command is a time-out terminal 90 (i.e., whether or not the terminal 90 that sent the command is a terminal 90 for which the valid period of which notification was given has expired). Additionally, if the received command is a prohibited command, the remote controller 30 nullifies the command without outputting the command to the indoor unit control component 21. Because of this, the prohibited command is not sent to the indoor unit control component 21, and the switching control of the various actuators is not executed in response to the prohibited command.

Furthermore, the remote controller 30 generates and displays on the touchscreen 36 the error display data in order to give notification to the user that an error has occurred (that a prohibited command was sent). Because of this, the user can grasp that the user himself/herself input a prohibited command.

(6-5) Period S5

In period S5 of FIG. 12 is shown a flow until a command sent from the terminal 90 is nullified after the valid period (t1) for the communication connection (user connection) between the terminal 90 and the remote controller 30 has expired.

When the user inputs a command to the time-out terminal 90 (a terminal 90 for which the valid period in the valid period information of which notification was given has expired) and sends the command to the remote controller 30 via the wireless network NW1, the remote controller 30 receives the command and determines whether or not the command is a permitted command and whether or not the terminal 90 that sent the command is a time-out terminal 90 (i.e., whether or not the terminal 90 that sent the command is a terminal 90 for which the valid period of which notification was given has expired). Additionally, in a case where the received command is a command (an invalid command) sent from the time-out terminal 90, the remote controller 30 nullifies the invalid command without outputting the invalid command to the indoor unit control component 21. Because of this, the invalid command is not sent to the indoor unit control component 21, and the switching control of the various actuators is not executed in response to the invalid command.

Furthermore, the remote controller 30 generates and displays on the touchscreen 36 the error display data in order to give notification to the user that an error has occurred (that the valid period for the communication connection has expired). At this time, a display of the error display data such as shown in FIG. 9 is performed in the touchscreen 36. Because of this, the user can grasp that the communication connection has become invalid and is prompted to perform work pertaining to establishing a new communication connection (user connection).

(6-6) Period S6

In period S6 of FIG. 12 is shown a flow until a communication connection (user connection) is reestablished between the terminal 90 and the remote controller 30 after the valid period for the communication connection (user connection) between the terminal 90 and the remote controller 30 has expired.

The flow of processes in period S6 is basically the same as the flow of processes in period S2. However, in period S6, the user password information is updated in the remote controller 30, and notification of connection information (more specifically, user password information) different from the connection information in period S2 is given from the remote controller 30 to the terminal 90. Furthermore, the valid period information of which notification is given to the terminal 90 in period S6 is data different from the valid period information of which notification is given to the terminal 90 in period S2 and specifies a new communication start timing and communication end timing.

Because of this, the terminal 90 (the time-out terminal 90) of a user who continues use of the utilization space SP even after the expiration of the valid period for the communication connection that was established can establish a new communication connection (user connection) with the remote controller 30. That is, in the indoor unit 20, the notification component 68 is configured to give notification of the connection information including the new valid period information to the time-out terminal 90 for which the valid period designated in the valid period information of which notification was given has expired.

(6-7) Periods S7, S8, and S9

The flows of processes in periods S7 to S9 in FIG. 12 are basically the same as the flows of processes in periods S3 to S5.

(7) Characteristics of Indoor Unit 20

(7-1)

The indoor unit 20 pertaining to the above embodiment has excellent security.

That is, in addition to an air conditioner configured in such a way that it can communicate with a portable communication terminal in the possession of a user and configured in such a way that its operating state can be switched via the portable communication terminal being installed in a space in which the user and the manager coincide with each other, such as a general household, cases are also conceivable where the air conditioner is installed in a space in which the user temporarily stays (i.e., a space in which the user and the manager do not coincide with each other), such as a room in a hotel, a rental room or the like. In such cases, it is desired for security reasons to permit a user who will temporarily stay in the space in which the air conditioner is installed to switch the operating state while limiting a user whose stay has ended (a vacating person) from switching the operating state. However, in a case where the conventional air conditioner is installed in a space in which the user and the manager do not coincide with each other, it becomes possible for the operating state to be switched even by the portable communication terminal of the vacating person who does not have use authorization, so there are concerns about security problems.

In the indoor unit 20 pertaining to the above embodiment, the notification component 68 gives notification of the specific information (the identification information and the valid period information) to the terminal 90, and the first communication control component 66 stores in the command storage region 612 permitted commands received from the terminal 90 to which notification of the specific information was given but nullifies invalid commands sent from the time-out terminal 90 for which the valid period of which notification was given has expired. That is, the indoor unit 20 pertaining to the above embodiment is configured in such a way that permitted commands from the terminal 90 received are output to the indoor unit control component 21 but invalid commands are not output to the indoor unit control component 21. In other words, the indoor unit 20 pertaining to the above embodiment is configured in such a way that the indoor unit control component 21 executes the switching control on the basis of permitted commands sent from the terminal 90 to which notification of the specific information was given but does not execute the switching control in response to invalid commands sent from the time-out terminal 90.

Because of this, in a case where the indoor unit 20 is installed in the facility 1 in which the user temporarily stays (i.e., a space in which the user and the manager do not coincide with each other), such as a lodging facility like a hotel, or a rental room, it becomes possible to limit the terminal 90 made to function as a command input device, and it becomes possible to limit the operator to the manager and the user of the facility 1 (i.e., a person who has use authorization). In particular, it becomes possible to limit the switching of the operating state by the terminal 90 of a vacating person whose use of the facility 1 has already ended (i.e., a person who does not have use authorization). As a result, even in a case where the indoor unit 20 is installed in a space in which the user and the manager do not coincide with each other, the indoor unit 20 is kept from being operated by an outsider who does not have use authorization. Thus, security is improved.

(7-2)

In the indoor unit 20 pertaining to the above embodiment, the notification component 68 gives notification of the specific information including the password information to the terminal 90, and the connection control component 69 performs the judgment of whether or not to establish a communication connection with the terminal 90 on the basis of the presence/absence (suitability) of the password information included in the request signal sent from the terminal 90.

Because of this, in a case where the indoor unit 20 is installed in the facility 1 in which the user temporarily stays (i.e., a space in which the user and the manager do not coincide with each other), such as a lodging facility like a hotel, a rental room or the like, it becomes possible to limit the terminal 90 made to function as a command input device, and it becomes possible to limit the operator to the manager and the user of the facility 1 (i.e., a person who has use authorization). In particular, it becomes possible to limit the switching of the operating state by the terminal 90 of a vacating person whose use of the facility 1 has already ended. As a result, even in a case where the indoor unit 20 is installed in a space in which the user and the manager do not coincide with each other, the indoor unit 20 is kept from being operated by an outsider who does not have use authorization. Thus, security is excellent.

(7-3)

In the indoor unit 20 pertaining to the above embodiment, specified in the valid period information of which notification is given to the terminal 90 are the communication start timing, which is a timing at which it becomes possible for the operating state to be switched by the terminal 90 to which notification was given, and the communication end timing, which is a timing at which it becomes impossible for the operating state to be switched by the terminal 90 to which notification was given. That is, the valid period (the communication start timing and the communication end timing) is set in accordance with the timing at which the user starts operation. Because of this, in a case where the indoor unit 20 is installed in a space in which the user and the manager do not coincide with each other, convenience is excellent for managing the indoor unit 20.

(7-4)

In the indoor unit 20 pertaining to the above embodiment, the notification component 68 is configured to give notification of the specific information including new valid period information and new password information to the time-out terminal 90 that is in the utilization space SP and for which the valid period designated in the valid period information of which notification was given has expired.

Because of this, it becomes possible to set a new valid period for a user who continues use of the utilization space SP even after the end of the valid period. Thus, in a case where the indoor unit 20 is installed in a space in which the user and the manager do not coincide with each other, security is ensured and convenience is excellent.

(7-5)

In the indoor unit 20 pertaining to the above embodiment, the user password information is included in the specific information of which notification is given to the terminal 90 from the notification component 68, and the connection control component 69 performs the judgment of whether or not to establish a communication connection (user connection) with the terminal 90 on the basis of the presence/absence (suitability) of the user password information included in the connection request signal sent from the terminal 90.

Because of this, in a case where the indoor unit 20 is installed in a space in which the user and the manager do not coincide with each other, it becomes possible to further limit the terminal 90 made to function as a command input device, and it becomes possible to limit the operator to the manager and a specific user (i.e., a person who has use authority). As a result, in a case where the indoor unit 20 is installed in a space in which the user and the manager do not coincide with each other, the indoor unit 20 is kept from being operated by an outsider who does not have use authorization. Thus, security is excellent.

(7-6)

In the indoor unit 20 pertaining to the above embodiment, the password information storage region 616 stores the manager password information, which is the password information needed for the manager connection, and the user password information, which is the password information needed for the user connection, and the connection control component 69 performs the judgment of whether or not to establish the manager connection on the basis of the presence/absence (suitability) of the manager password information included in the connection request signal and performs the judgment of whether or not to establish the user connection on the basis of the presence/absence (suitability) of the user password information included in the connection request signal.

Because of this, in a case where the indoor unit 20 is installed in a space in which the user and the manager do not coincide with each other, it becomes possible to set setting items that can be switched within the operating state for each communication connection established between the indoor unit 20 and the terminal 90. As a result, it becomes possible to set the setting items in such a way that each user is permitted to perform general operations but only the manager can perform specific operations. Thus, security is excellent.

(7-7)

In the indoor unit 20 pertaining to the above embodiment, the indoor unit control component 21 is configured to not execute the switching control in response to prohibited commands sent from the terminal 90 (i.e., commands instructing the switching of setting items other than the permitted items specified in the setting item table TB1).

Because of this, it easily becomes possible to manage the indoor unit 20 in such a way that each user is permitted to perform general operations but only the manager can perform specific operations. Thus, security is excellent, and convenience is excellent for managing the indoor unit 20.

(7-8)

In the indoor unit 20 pertaining to the above embodiment, the adapter 37 performs communication with the terminal 90 via the wireless network NW. The notification component 68 gives notification of the specific information to the terminal 90 by the near-field wireless network NW2 different from the wireless network NW1.

That is, notification of the specific information is given to the terminal 90 using the near-field wireless network NW2 different from the wireless network NW1 utilized in the case of receiving commands from the terminal 90 (i.e., a case where the terminal 90 functions as an input device). That is to say, it becomes possible to give notification of the specific information using a dedicated communication network. Thus, security is excellent.

(8) Example Modifications

The above embodiment can be appropriately modified as described in the following example modifications. It will be noted that each example modification may also be combined with another example modification and applied to the extent that no incompatibilities arise.

(8-1) Example Modification A

In the above embodiment, when the remote controller control component 39 (the notification component 68) received the address request signal from the terminal 90 by near-field wireless communication via the communication module 38, the remote controller control component 39 (the notification component 68) gave notification of the application address to the terminal 90 by sending a URL corresponding to the application address to the terminal 90 that sent the address request signal. However, the method by which notification of the application address is given to the terminal 90 is not invariably limited to this.

For example, the remote controller control component 39 (the notification component 68) may also be configured in such a way that, when it has received the address request signal from the terminal 90 by near-field wireless communication via the communication module 38, it gives notification of the application address to the terminal 90 by sending data such as a QR code (registered trademark), a barcode or the like corresponding to the application address to the terminal 90 that sent the address request signal.

Furthermore, for example, the remote controller control component 39 (the display data generating component 63) may also give notification of the application address by being configured to generate predetermined display data and display, on the touchscreen 36, information such as a URL, a QR code, a barcode or the like corresponding to the application address.

(8-2) Example Modification B

In the above embodiment, when the remote controller control component 39 (the notification component 68) received a predetermined signal (the connection information request signal) from the terminal 90 by near-field wireless communication via the communication module 38, the remote controller control component 39 (the notification component 68) gave notification of the connection information (the identification information and the user password information) to the terminal 90. However, the method by which notification of the connection information is given to the terminal 90 is not invariably limited to this.

For example, the remote controller control component 39 (the notification component 68) may also be configured in such a way that, when it has received the connection information request signal from the terminal 90 by near-field wireless communication via the communication module 38, it gives notification of the connection information to the terminal 90 by sending data such as a QR code, a barcode or the like corresponding to the connection information to the terminal 90 that sent the connection information request signal.

Furthermore, for example, the remote controller control component 39 (the display data generating component 63) may also give notification of the connection information by being configured to generate predetermined display data and display, on the touchscreen 36, the connection information or data such as a QR code, a barcode or the like corresponding to the connection information. In this case, the communication module 38 (i.e., the near-field wireless communication function) may be omitted from the remote controller 30.

(8-3) Example Modification C

In the above embodiment, notification of the specific information (the valid period information and the connection information) was given to the terminal 90 at a predetermined timing from the remote controller 30 to the terminal 90. In a case where the indoor unit 20 is installed in a space in which the user and the manager do not coincide with each other, it is preferred that notification of the valid period information be given to the terminal 90 from the standpoint of precisely keeping the indoor unit 20 from being operated by an outsider who does not have use authorization. However, it is possible to appropriately omit the valid period information.

That is, even in a case where notification of the valid period information is not given from the remote controller 30 to the terminal 90, the remote controller control component 39 (the notification component 68) gives notification of the specific information including the password information to the terminal 90, and the connection control component 69 performs the judgment of whether or not to establish a communication connection with the terminal 90 on the basis of the presence/absence (suitability) of the password information included in the request signal sent from the terminal 90. With this configuration also, it is possible to limit the terminal 90 made to function as a command input device, and it is possible to limit the operator to the manager and the user of the facility 1 (i.e., a person who has use authorization). Thus, even in a case where the indoor unit 20 is installed in a space in which the user and the manager do not coincide with each other, the indoor unit 20 is kept from being operated by an outsider who does not have use authorization.

(8-4) Example Modification D

In the above embodiment, the remote controller 30 has the start/stop switching key 35 and the touchscreen 36 (the touch input portions 36*a*) serving as command input means. However, the remote controller 30 does not invariably need to have the start/stop switching key 35 and the touch input portions 36*a*, and these may be appropriately omitted. In this case, the remote controller 30 does not function as a command input device, and the user can input commands only with the terminal 90 that has established a communication connection with the remote controller 30. As a result, in a case where the indoor unit 20 is installed in a space in which the user and the manager do not coincide with each other, management of the indoor unit 20 becomes easier and security is further improved.

(8-5) Example Modification E

In the above embodiment, the remote controller control component 39 (the first communication control component 66) is configured to nullify, without storing in the command storage region 612, prohibited commands sent from the terminal 90 and sets the error flag 619, so that the switching control is not executed when a prohibited command has been sent. However, the remote controller control component 39 is not limited to this and may also send the setting item table TB1 together with the specific information when establishing a communication connection with the terminal 90, and the application may be configured in such a way that prohibited commands defined in the setting item table TB1 that was sent cannot be sent from the terminal 90. In this case also, the switching control is not executed in response to prohibited commands, so effects that are the same as those in the above embodiment are achieved.

(8-6) Example Modification F

In the above embodiment, the remote controller control component 39 (the first communication control component 66) is configured to nullify, without storing in the command storage region 612, invalid commands sent from the time-out terminal 90 and sets the error flag 619, so that the switching control is not executed in response to invalid commands. However, the application is not limited to this and may also be configured in such a way that, in a case where the valid period specified in the valid period information that was sent has ended, commands cannot be sent from the terminal 90. In this case also, the switching control is not executed in response to invalid commands from the time-out terminal 90, so effects that are the same as those in the above embodiment are achieved.

(8-7) Example Modification G

In the above embodiment, the application address and the connection information were sent separately (at different timings) from the remote controller 30 to the terminal 90. However, the invention may also be configured so that the connection information is sent at the same time that the application address is sent from the remote controller 30 to the terminal 90.

(8-8) Example Modification H

In the above embodiment, the management server 50 is disposed on the wide area network NW3. However, the management server 50 does not invariably need to be disposed on the wide area network NW3 and may also be disposed inside the facility 1.

Furthermore, the application does not invariably need to be retained in the management server 50 and may also be stored in a memory included in the outdoor unit control component 11, the indoor unit control component 21, or the remote controller control component 39.

(8-9) Example Modification I

In the above embodiment, the valid period is set to 24 hours. However, the valid period can be appropriately changed in accordance with the installation environment and the design specifications. For example, the valid period may also be set to 3 hours or may also be set to 30 days.

(8-10) Example Modification J

In the above embodiment, in the setting item table TB1 (FIG. 8), "switch between starting/stopping," "select set temperature," "select set air volume," and "select set air direction" were defined as permitted commands (permitted items) while "switch operating mode" is defined as a prohibited command. However, in the setting item table TB1, the permitted commands and the prohibited commands can be freely set, and it suffices for them to be appropriately set in accordance with the installation environment and the design specifications. For example, in the setting item table TB1, "select set temperature" may also be defined as a prohibited command.

(8-11) Example Modification K

In the above embodiment, the indoor unit control component 21 and the remote controller control component 39 were separately disposed. However, some or all of the indoor unit control component 21 and some or all of the remote controller control component 39 may also be integrally configured. In this case, the integrally configured control component may be disposed in the indoor unit 20, or may be disposed in the remote controller 30, or may be disposed in the outdoor unit 10, or may be disposed in a remote location connected via a communication network.

(8-12) Example Modification L

In the above embodiment, the indoor unit 20 is installed in the facility 1 including the plural utilization spaces SP. However, the environment in which the indoor unit 20 is installed is not particularly limited, and the indoor unit 20 can be installed in any environment. For example, the indoor unit 20 may also be installed in a facility that includes a single utilization space SP. Furthermore, the indoor unit 20 may be installed not only in a space in which the manager and the user do not coincide with each other but also a space in which the manager and the user coincide with each other.

(8-13) Example Modification M

In the above embodiment, the indoor unit 20 serving as the "air conditioner" is an indoor unit of an air conditioning system. However, the indoor unit 20 is not limited to this and may also be another device that is installed in a target space and performs air conditioning, such as an air purifier, a ventilation device, a dehumidifier or the like.

INDUSTRIAL APPLICABILITY

The present invention is applicable to an air conditioner.

What is claimed is:

1. An air conditioner that is installed in a target space, has an operating state switched based on a command sent from a portable communication terminal that a user has, and performs air conditioning of the target space, the air conditioner comprising:
    a specific information storage component that stores specific information including identification information that identifies the specific information;
    a specific information notification component that gives notification of the specific information to the portable communication terminal;
    a command receiving component that receives the command sent from the portable communication terminal to which notification of the specific information was given; and
    an actuator drive component that executes a switching control that switches action of an actuator based on the command received,
    the specific information including operable period information that designates an operable period during which the operating state is switchable by the portable communication terminal to which notification was given, and
    the actuator drive component not executing the switching control in response to the command sent from the portable communication terminal for which the operable period designated in the operable period information of which notification was given has expired.

2. The air conditioner according to claim 1, wherein the operable period information includes information that specifies
    a start timing, at which the operating state is switchable by the portable communication terminal to which notification of the operable period information was given, and
    an end timing, at which the operating state is switchable by the portable communication terminal to which notification of the operable period information was given.

3. The air conditioner according to claim 2, wherein
    the specific information notification component gives notification of the specific information including new operable period information to the portable communication terminal that is in the target space and for which the operable period designated in the operable period information of which notification was given has expired.

4. The air conditioner according to claim 2, further comprising
    a judgment component that performs a judgment of whether to establish a communication connection with the portable communication terminal based on a request signal sent from the portable communication terminal,
    the judgment component performing the judgment based on suitability of password information included in the request signal, and
    the password information being included in the specific information.

5. The air conditioner according to claim 1, wherein
the specific information notification component gives notification of the specific information including new operable period information to the portable communication terminal that is in the target space and for which the operable period designated in the operable period information of which notification was given has expired.

6. The air conditioner according to claim 5, further comprising
a judgment component that performs a judgment of whether to establish a communication connection with the portable communication terminal based on a request signal sent from the portable communication terminal,
the judgment component performing the judgment based on suitability of password information included in the request signal, and
the password information being included in the specific information.

7. The air conditioner according to claim 1, further comprising
a judgment component that performs a judgment of whether to establish a communication connection with the portable communication terminal based on a request signal sent from the portable communication terminal,
the judgment component performing the judgment based on suitability of password information included in the request signal, and
the password information being included in the specific information.

8. The air conditioner according to claim 7, wherein
the communication connection includes a manager connection with the portable communication terminal of a manager and a user connection with the portable communication terminal of the user other than the manager, and
the air conditioner further comprises
a manager password storage component that stores manager password information needed for the manager connection, and
a user password storage component that stores user password information needed for the user connection,
the judgment component performing a judgment of whether to establish the manager connection based on suitability of the manager password information included in the request signal and performing a judgment of whether to establish the user connection based on suitability of the user password information included in the request signal.

9. The air conditioner according to claim 7, further comprising
a setting item information storage component that stores setting item information that specifies a permitted item that is a setting item, within the operating state, that can be switched by the portable communication terminal,
the actuator drive component not executing the switching control in a case in which the command sent from the portable communication terminal instructs switching of a setting item other than the permitted item specified in the setting item information.

10. The air conditioner according to claim 7, wherein
the command receiving; component performs communication with the portable communication terminal via a wireless communication network constructed using a predetermined wireless communication standard, and
the specific information notification component gives notification of the specific information to the portable communication terminal by another communication network different from the wireless communication network or another notification unit.

11. The air conditioner according to claim 7, wherein
the communication connection includes a manager connection with the portable communication terminal of a manager and a user connection with the portable communication terminal of the user other than the manager, and
the air conditioner further comprises
a manager password storage component that stores manager password information needed for the manager connection, and
a user password storage component that stores user password information needed for the user connection,
the judgment component performing a judgment of whether to establish the manager connection based on suitability of the manager password information included in the request signal and performing a judgment of whether to establish the user connection based on suitability of the user password information included in the request signal.

12. The air conditioner according to claim 1, further comprising
a setting item information storage component that stores setting item information that specifies a permitted item that is a setting item, within the operating state, that can be switched by the portable communication terminal,
the actuator drive component not executing the switching control in a case in which the command sent from the portable communication terminal instructs switching of a setting item other than the permitted item specified in the setting item information.

13. The air conditioner according to claim 1, wherein
the command receiving component performs communication with the portable communication terminal via a wireless communication network constructed using a predetermined wireless communication standard, and
the specific information notification component gives notification of the specific information to the portable communication terminal by another communication network different from the wireless communication network or another notification unit.

* * * * *